(12) United States Patent
Rihn et al.

(10) Patent No.: US 9,544,504 B2
(45) Date of Patent: Jan. 10, 2017

(54) RAPID SYNCHRONIZED LIGHTING AND SHUTTERING

(71) Applicant: Microsoft Technology Licensing, LLC, Redmond, WA (US)

(72) Inventors: Bernard K. Rihn, Snohomish, WA (US); Paul Henry Dietz, Redmond, WA (US); Nigel Stuart Keam, Redmond, WA (US); Steven Nabil Bathiche, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/921,569

(22) Filed: Oct. 23, 2015

(65) Prior Publication Data

US 2016/0044225 A1 Feb. 11, 2016

Related U.S. Application Data

(62) Division of application No. 14/325,247, filed on Jul. 7, 2014, now abandoned, which is a division of
(Continued)

(51) Int. Cl.
*H04N 5/235* (2006.01)
*H04N 5/225* (2006.01)
(Continued)

(52) U.S. Cl.
CPC .......... *H04N 5/2353* (2013.01); *G06K 9/4661* (2013.01); *G06K 9/6201* (2013.01);
(Continued)

(58) Field of Classification Search
None
See application file for complete search history.

(56) References Cited

U.S. PATENT DOCUMENTS

| 578,325 A | 3/1897 | Fleming |
| 4,046,975 A | 9/1977 | Seeger, Jr. |

(Continued)

FOREIGN PATENT DOCUMENTS

| CN | 103455149 | 12/2013 |
| EP | 1223722 | 7/2002 |

(Continued)

OTHER PUBLICATIONS

"Corrected Notice of Allowance", U.S. Appl. No. 13/471,054, Jan. 11, 2016, 2 pages.
(Continued)

*Primary Examiner* — Michael Osinski
(74) *Attorney, Agent, or Firm* — Brandon Roper; Judy Yee; Micky Minhas

(57) ABSTRACT

This document describes various apparatuses and techniques for rapid synchronized lighting and shuttering. These apparatuses and techniques are capable of capturing two images, where one of the images integrates multiple exposures during which an image area is illuminated by a light source and another of the images integrates multiple exposures during which the image is not illuminated by the light source. The image area can be illuminated by rapidly flashing the image area with the light source and synchronizing a shutter to permit one image sensor to capture an image when the image area is illuminated and another image sensor to capture the image area when the image area is not illuminated. These two images can be captured concurrently or nearly concurrently, thereby reducing or eliminating motion artifacts. Further, these apparatuses and techniques may do so with slow and relatively low-cost cameras and relatively low computational costs.

20 Claims, 8 Drawing Sheets

Related U.S. Application Data application No. 13/667,408, filed on Nov. 2, 2012, now Pat. No. 8,786,767.

(51) Int. Cl.
  *G06K 9/46* (2006.01)
  *G06K 9/62* (2006.01)
  *G06T 7/00* (2006.01)
  *G06T 7/20* (2006.01)
  *H04N 5/232* (2006.01)

(52) U.S. Cl.
  CPC .............. *G06T 7/0042* (2013.01); *G06T 7/20* (2013.01); *H04N 5/2256* (2013.01); *H04N 5/2258* (2013.01); *H04N 5/2354* (2013.01); *H04N 5/23229* (2013.01)

(56) References Cited

U.S. PATENT DOCUMENTS

| | | | |
|---|---|---|---|
| 4,065,649 A | 12/1977 | Carter et al. | |
| 4,243,861 A | 1/1981 | Strandwitz | |
| 4,302,648 A | 11/1981 | Sado et al. | |
| 4,317,013 A | 2/1982 | Larson | |
| 4,365,130 A | 12/1982 | Christensen | |
| 4,492,829 A | 1/1985 | Rodrique | |
| 4,527,021 A | 7/1985 | Morikawa et al. | |
| 4,559,426 A | 12/1985 | Van Zeeland et al. | |
| 4,577,822 A | 3/1986 | Wilkerson | |
| 4,588,187 A | 5/1986 | Dell | |
| 4,607,147 A | 8/1986 | Ono et al. | |
| 4,651,133 A | 3/1987 | Ganesan et al. | |
| 4,735,394 A | 4/1988 | Facco | |
| 5,008,497 A | 4/1991 | Asher | |
| 5,111,223 A | 5/1992 | Omura | |
| 5,128,829 A | 7/1992 | Loew | |
| 5,220,521 A | 6/1993 | Kikinis | |
| 5,283,559 A | 2/1994 | Kalendra et al. | |
| 5,331,443 A | 7/1994 | Stanisci | |
| 5,349,403 A | 9/1994 | Lo | |
| 5,375,076 A | 12/1994 | Goodrich et al. | |
| 5,480,118 A | 1/1996 | Cross | |
| 5,546,271 A | 8/1996 | Gut et al. | |
| 5,548,477 A | 8/1996 | Kumar et al. | |
| 5,558,577 A | 9/1996 | Kato | |
| 5,621,494 A | 4/1997 | Kazumi et al. | |
| 5,681,220 A | 10/1997 | Bertram et al. | |
| 5,737,183 A | 4/1998 | Kobayashi et al. | |
| 5,745,376 A | 4/1998 | Barker et al. | |
| 5,748,114 A | 5/1998 | Koehn | |
| 5,781,406 A | 7/1998 | Hunte | |
| 5,807,175 A | 9/1998 | Davis et al. | |
| 5,818,361 A | 10/1998 | Acevedo | |
| 5,828,770 A | 10/1998 | Leis et al. | |
| 5,842,027 A | 11/1998 | Oprescu et al. | |
| 5,874,697 A | 2/1999 | Selker et al. | |
| 5,905,485 A | 5/1999 | Podoloff | |
| 5,926,170 A | 7/1999 | Oba | |
| 5,929,946 A | 7/1999 | Sharp et al. | |
| 5,971,635 A | 10/1999 | Wise | |
| 6,002,389 A | 12/1999 | Kasser | |
| 6,005,209 A | 12/1999 | Burleson et al. | |
| 6,012,714 A | 1/2000 | Worley et al. | |
| 6,040,823 A | 3/2000 | Seffernick et al. | |
| 6,044,717 A | 4/2000 | Biegelsen et al. | |
| 6,061,644 A | 5/2000 | Leis | |
| 6,108,200 A | 8/2000 | Fullerton | |
| 6,128,007 A | 10/2000 | Seybold | |
| 6,178,443 B1 | 1/2001 | Lin | |
| 6,254,105 B1 | 7/2001 | Rinde et al. | |
| 6,278,490 B1 | 8/2001 | Fukuda et al. | |
| 6,329,617 B1 | 12/2001 | Burgess | |
| 6,344,791 B1 | 2/2002 | Armstrong | |
| 6,366,440 B1 | 4/2002 | Kung | |
| 6,380,497 B1 | 4/2002 | Hashimoto et al. | |
| 6,437,682 B1 | 8/2002 | Vance | |
| 6,511,378 B1 | 1/2003 | Bhatt et al. | |
| 6,532,035 B1 | 3/2003 | Saari et al. | |
| 6,532,147 B1 | 3/2003 | Christ, Jr. | |
| 6,543,949 B1 | 4/2003 | Ritchey et al. | |
| 6,565,439 B2 | 5/2003 | Shinohara et al. | |
| 6,574,030 B1 | 6/2003 | Mosier | |
| 6,597,347 B1 | 7/2003 | Yasutake | |
| 6,600,121 B1 | 7/2003 | Olodort et al. | |
| 6,603,408 B1 | 8/2003 | Gaba | |
| 6,608,664 B1 | 8/2003 | Hasegawa | |
| 6,617,536 B2 | 9/2003 | Kawaguchi | |
| 6,651,943 B2 | 11/2003 | Cho et al. | |
| 6,677,999 B2 * | 1/2004 | Bean ..................... | H04N 5/238 348/335 |
| 6,685,369 B2 | 2/2004 | Lien | |
| 6,695,273 B2 | 2/2004 | Iguchi | |
| 6,700,617 B1 | 3/2004 | Hamamura et al. | |
| 6,704,864 B1 | 3/2004 | Philyaw | |
| 6,721,019 B2 | 4/2004 | Kono et al. | |
| 6,725,318 B1 | 4/2004 | Sherman et al. | |
| 6,753,920 B1 | 6/2004 | Momose et al. | |
| 6,774,888 B1 | 8/2004 | Genduso | |
| 6,776,546 B2 | 8/2004 | Kraus et al. | |
| 6,781,819 B2 | 8/2004 | Yang et al. | |
| 6,784,869 B1 | 8/2004 | Clark et al. | |
| 6,813,143 B2 | 11/2004 | Makela | |
| 6,819,316 B2 | 11/2004 | Schulz et al. | |
| 6,856,506 B2 | 2/2005 | Doherty et al. | |
| 6,859,565 B2 | 2/2005 | Baron | |
| 6,861,961 B2 | 3/2005 | Sandbach et al. | |
| 6,914,197 B2 | 7/2005 | Doherty et al. | |
| 6,950,950 B2 | 9/2005 | Sawyers et al. | |
| 6,976,799 B2 | 12/2005 | Kim et al. | |
| 7,002,624 B1 | 2/2006 | Uchino et al. | |
| 7,007,238 B2 | 2/2006 | Glaser | |
| 7,046,292 B2 * | 5/2006 | Ziemkowski ........ | H04N 5/2256 348/207.99 |
| 7,091,436 B2 | 8/2006 | Serban | |
| 7,099,149 B2 | 8/2006 | Krieger et al. | |
| 7,102,683 B2 | 9/2006 | Perry et al. | |
| 7,106,222 B2 | 9/2006 | Ward et al. | |
| 7,123,292 B1 | 10/2006 | Seeger et al. | |
| 7,129,979 B1 | 10/2006 | Lee | |
| D535,292 S | 1/2007 | Shi et al. | |
| 7,162,153 B2 | 1/2007 | Harter, Jr. et al. | |
| 7,194,662 B2 | 3/2007 | Do et al. | |
| 7,213,991 B2 | 5/2007 | Chapman et al. | |
| 7,260,221 B1 | 8/2007 | Atsmon | |
| 7,277,087 B2 | 10/2007 | Hill et al. | |
| 7,295,720 B2 | 11/2007 | Raskar | |
| 7,301,759 B2 | 11/2007 | Hsiung | |
| 7,379,094 B2 | 5/2008 | Yoshida et al. | |
| 7,400,452 B2 | 7/2008 | Detro et al. | |
| 7,443,443 B2 | 10/2008 | Raskar et al. | |
| 7,469,386 B2 | 12/2008 | Bear et al. | |
| 7,486,165 B2 | 2/2009 | Ligtenberg et al. | |
| 7,496,291 B2 * | 2/2009 | Bloom ................... | G03B 13/34 348/296 |
| 7,499,037 B2 | 3/2009 | Lube | |
| 7,509,042 B2 | 3/2009 | Mori et al. | |
| 7,542,052 B2 | 6/2009 | Solomon et al. | |
| 7,558,594 B2 | 7/2009 | Wilson | |
| 7,559,834 B1 | 7/2009 | York | |
| 7,567,293 B2 * | 7/2009 | Perlman ................ | H04N 5/2224 348/207.99 |
| RE40,891 E | 9/2009 | Yasutake | |
| 7,636,921 B2 | 12/2009 | Louie | |
| 7,656,392 B2 | 2/2010 | Bolender | |
| 7,724,952 B2 | 5/2010 | Shum et al. | |
| 7,729,493 B2 | 6/2010 | Krieger et al. | |
| 7,731,147 B2 | 6/2010 | Rha | |
| 7,733,326 B1 | 6/2010 | Adiseshan | |
| 7,777,972 B1 | 8/2010 | Chen et al. | |
| 7,782,342 B2 | 8/2010 | Koh | |
| 7,813,715 B2 | 10/2010 | McKillop et al. | |
| 7,822,338 B2 | 10/2010 | Wernersson | |
| 7,865,639 B2 | 1/2011 | McCoy et al. | |
| 7,884,807 B2 | 2/2011 | Hovden et al. | |

(56) References Cited

U.S. PATENT DOCUMENTS

| | | | |
|---|---|---|---|
| D636,397 S | 4/2011 | Green |
| 7,927,654 B2 | 4/2011 | Hagood et al. |
| 7,928,964 B2 | 4/2011 | Kolmykov-Zotov et al. |
| 7,944,520 B2 | 5/2011 | Ichioka et al. |
| 7,945,717 B2 | 5/2011 | Rivalsi |
| 7,973,771 B2 | 7/2011 | Geaghan |
| 7,978,281 B2 | 7/2011 | Vergith et al. |
| 8,016,255 B2 | 9/2011 | Lin |
| 8,053,688 B2 | 11/2011 | Conzola et al. |
| 8,065,624 B2 | 11/2011 | Morin et al. |
| 8,069,356 B2 | 11/2011 | Rathi et al. |
| 8,090,885 B2 | 1/2012 | Callaghan et al. |
| 8,098,233 B2 | 1/2012 | Hotelling et al. |
| 8,115,499 B2 | 2/2012 | Osoinach et al. |
| 8,117,362 B2 | 2/2012 | Rodriguez et al. |
| 8,118,274 B2 | 2/2012 | McClure et al. |
| 8,130,203 B2 | 3/2012 | Westerman |
| 8,154,524 B2 | 4/2012 | Wilson et al. |
| 8,162,282 B2 | 4/2012 | Hu et al. |
| D659,139 S | 5/2012 | Gengler |
| 8,169,421 B2 | 5/2012 | Wright et al. |
| 8,179,236 B2 | 5/2012 | Weller et al. |
| 8,184,190 B2 | 5/2012 | Dosluoglu |
| 8,229,509 B2 | 7/2012 | Paek et al. |
| 8,229,522 B2 | 7/2012 | Kim et al. |
| 8,231,099 B2 | 7/2012 | Chen |
| 8,248,791 B2 | 8/2012 | Wang et al. |
| 8,255,708 B1 | 8/2012 | Zhang |
| 8,264,310 B2 | 9/2012 | Lauder et al. |
| 8,267,368 B2 | 9/2012 | Torii et al. |
| 8,274,784 B2 | 9/2012 | Franz et al. |
| 8,279,589 B2 | 10/2012 | Kim |
| 8,322,290 B1 | 12/2012 | Mignano |
| 8,387,078 B2 | 2/2013 | Memmott |
| 8,416,559 B2 | 4/2013 | Agata et al. |
| 8,498,100 B1 | 7/2013 | Whitt, III et al. |
| 8,543,227 B1 | 9/2013 | Perek et al. |
| 8,548,608 B2 | 10/2013 | Perek et al. |
| 8,564,944 B2 | 10/2013 | Whitt, III et al. |
| 8,570,725 B2 | 10/2013 | Whitt, III et al. |
| 8,587,701 B2 | 11/2013 | Tatsuzawa |
| 8,599,542 B1 | 12/2013 | Healey et al. |
| 8,610,015 B2 | 12/2013 | Whitt et al. |
| 8,614,666 B2 | 12/2013 | Whitman et al. |
| 8,646,999 B2 | 2/2014 | Shaw et al. |
| 8,699,215 B2 | 4/2014 | Whitt, III et al. |
| 8,719,603 B2 | 5/2014 | Belesiu |
| 8,724,302 B2 | 5/2014 | Whitt, III et al. |
| 8,786,767 B2 | 7/2014 | Rihn et al. |
| 9,204,129 B2 * | 12/2015 | Keshavmurthy .... G01B 11/245 |
| 9,275,809 B2 | 3/2016 | Panay et al. |
| 2002/0044216 A1 | 4/2002 | Cha |
| 2002/0113882 A1 | 8/2002 | Pollard et al. |
| 2002/0134828 A1 | 9/2002 | Sandbach et al. |
| 2003/0007086 A1* | 1/2003 | Bean ........................ H04N 5/238 |
| | | 348/363 |
| 2003/0036365 A1 | 2/2003 | Kuroda |
| 2003/0128285 A1 | 7/2003 | Itoh |
| 2003/0163611 A1 | 8/2003 | Nagao |
| 2003/0197687 A1 | 10/2003 | Shetter |
| 2003/0197806 A1 | 10/2003 | Perry et al. |
| 2003/0231243 A1 | 12/2003 | Shibutani |
| 2004/0056843 A1 | 3/2004 | Lin et al. |
| 2004/0156168 A1 | 8/2004 | LeVasseur et al. |
| 2004/0184677 A1* | 9/2004 | Raskar ........................ G06T 5/50 |
| | | 382/284 |
| 2004/0189822 A1 | 9/2004 | Shimada |
| 2004/0212601 A1 | 10/2004 | Cake et al. |
| 2004/0258924 A1 | 12/2004 | Berger et al. |
| 2004/0268000 A1 | 12/2004 | Barker et al. |
| 2005/0030728 A1 | 2/2005 | Kawashima et al. |
| 2005/0047773 A1 | 3/2005 | Satake et al. |
| 2005/0052831 A1 | 3/2005 | Chen |
| 2005/0055498 A1 | 3/2005 | Beckert et al. |
| 2005/0057515 A1 | 3/2005 | Bathiche |
| 2005/0059489 A1 | 3/2005 | Kim |
| 2005/0068460 A1 | 3/2005 | Lin |
| 2005/0094895 A1 | 5/2005 | Baron |
| 2005/0099400 A1 | 5/2005 | Lee |
| 2005/0134717 A1 | 6/2005 | Misawa |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2006/0085658 A1 | 4/2006 | Allen et al. |
| 2006/0125799 A1 | 6/2006 | Hillis et al. |
| 2006/0154725 A1 | 7/2006 | Glaser et al. |
| 2006/0155391 A1 | 7/2006 | Pistemaa et al. |
| 2006/0156415 A1 | 7/2006 | Rubinstein et al. |
| 2006/0176377 A1 | 8/2006 | Miyasaka |
| 2006/0181514 A1 | 8/2006 | Newman |
| 2006/0187216 A1 | 8/2006 | Trent, Jr. et al. |
| 2006/0195522 A1 | 8/2006 | Miyazaki |
| 2006/0198625 A1* | 9/2006 | Okuno .................... G03B 15/03 |
| | | 396/155 |
| 2006/0203096 A1* | 9/2006 | LaSalle ............. G06K 9/00221 |
| | | 348/208.14 |
| 2007/0003267 A1 | 1/2007 | Shibutani |
| 2007/0024742 A1 | 2/2007 | Raskar et al. |
| 2007/0056385 A1 | 3/2007 | Lorenz |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0081091 A1 | 4/2007 | Pan et al. |
| 2007/0145945 A1 | 6/2007 | McGinley et al. |
| 2007/0182663 A1 | 8/2007 | Biech |
| 2007/0182722 A1 | 8/2007 | Hotelling et al. |
| 2007/0185590 A1 | 8/2007 | Reindel et al. |
| 2007/0200830 A1 | 8/2007 | Yamamoto |
| 2007/0201859 A1 | 8/2007 | Sarrat |
| 2007/0220708 A1 | 9/2007 | Lewis |
| 2007/0234420 A1 | 10/2007 | Novotney et al. |
| 2007/0236408 A1 | 10/2007 | Yamaguchi et al. |
| 2007/0236475 A1 | 10/2007 | Wherry |
| 2007/0247432 A1 | 10/2007 | Oakley |
| 2007/0252674 A1 | 11/2007 | Nelson et al. |
| 2007/0260892 A1 | 11/2007 | Paul et al. |
| 2007/0263119 A1 | 11/2007 | Shum et al. |
| 2007/0264000 A1* | 11/2007 | Hsieh ........................ G03B 7/097 |
| | | 396/157 |
| 2007/0283179 A1 | 12/2007 | Burnett et al. |
| 2008/0019684 A1 | 1/2008 | Shyu et al. |
| 2008/0053222 A1 | 3/2008 | Ehrensvard et al. |
| 2008/0068451 A1 | 3/2008 | Hyatt |
| 2008/0084499 A1 | 4/2008 | Kisacanin et al. |
| 2008/0104437 A1 | 5/2008 | Lee |
| 2008/0106592 A1 | 5/2008 | Mikami |
| 2008/0151478 A1 | 6/2008 | Chern |
| 2008/0158185 A1 | 7/2008 | Westerman |
| 2008/0174570 A1 | 7/2008 | Jobs et al. |
| 2008/0177185 A1 | 7/2008 | Nakao et al. |
| 2008/0203277 A1 | 8/2008 | Warszauer et al. |
| 2008/0228969 A1 | 9/2008 | Cheah et al. |
| 2008/0238884 A1 | 10/2008 | Harish |
| 2008/0253822 A1 | 10/2008 | Matias |
| 2008/0303927 A1* | 12/2008 | Khanh ................. H04N 5/2258 |
| | | 348/262 |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0073957 A1 | 3/2009 | Newland et al. |
| 2009/0083562 A1 | 3/2009 | Park et al. |
| 2009/0091554 A1* | 4/2009 | Keam .................... G06F 3/0421 |
| | | 345/175 |
| 2009/0140985 A1 | 6/2009 | Liu |
| 2009/0147102 A1 | 6/2009 | Kakinuma et al. |
| 2009/0160944 A1 | 6/2009 | Trevelyan et al. |
| 2009/0167930 A1 | 7/2009 | Safaee-Rad et al. |
| 2009/0174759 A1 | 7/2009 | Yeh et al. |
| 2009/0195497 A1 | 8/2009 | Fitzgerald et al. |
| 2009/0231275 A1 | 9/2009 | Odgers |
| 2009/0231465 A1 | 9/2009 | Senba |
| 2009/0251008 A1 | 10/2009 | Sugaya |
| 2009/0259865 A1 | 10/2009 | Sheynblat et al. |
| 2009/0262492 A1 | 10/2009 | Whitchurch et al. |

(56) References Cited

U.S. PATENT DOCUMENTS

| | | |
|---|---|---|
| 2009/0265670 A1 | 10/2009 | Kim et al. |
| 2009/0284613 A1 | 11/2009 | Kim |
| 2009/0285491 A1 | 11/2009 | Ravenscroft et al. |
| 2009/0296331 A1 | 12/2009 | Choy |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0013319 A1 | 1/2010 | Kamiyama et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy |
| 2010/0051432 A1 | 3/2010 | Lin et al. |
| 2010/0053534 A1 | 3/2010 | Hsieh et al. |
| 2010/0077237 A1 | 3/2010 | Sawyers |
| 2010/0085321 A1 | 4/2010 | Pundsack |
| 2010/0102182 A1 | 4/2010 | Lin |
| 2010/0103112 A1 | 4/2010 | Yoo et al. |
| 2010/0103332 A1 | 4/2010 | Li et al. |
| 2010/0123686 A1 | 5/2010 | Klinghult et al. |
| 2010/0133398 A1 | 6/2010 | Chiu et al. |
| 2010/0142130 A1 | 6/2010 | Wang et al. |
| 2010/0149111 A1 | 6/2010 | Olien |
| 2010/0149377 A1 | 6/2010 | Shintani et al. |
| 2010/0157085 A1 | 6/2010 | Sasaki |
| 2010/0161522 A1 | 6/2010 | Tirpak et al. |
| 2010/0164857 A1 | 7/2010 | Liu et al. |
| 2010/0164897 A1 | 7/2010 | Morin et al. |
| 2010/0165181 A1* | 7/2010 | Murakami ............ H05N 5/2354 348/371 |
| 2010/0171875 A1 | 7/2010 | Yamamoto |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0222110 A1 | 9/2010 | Kim et al. |
| 2010/0235546 A1 | 9/2010 | Terlizzi et al. |
| 2010/0238320 A1 | 9/2010 | Washisu |
| 2010/0238620 A1 | 9/2010 | Fish |
| 2010/0250988 A1 | 9/2010 | Okuda et al. |
| 2010/0271771 A1 | 10/2010 | Wu et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0321877 A1 | 12/2010 | Moser |
| 2010/0324457 A1 | 12/2010 | Bean et al. |
| 2010/0325155 A1 | 12/2010 | Skinner et al. |
| 2011/0012866 A1 | 1/2011 | Keam |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0036965 A1 | 2/2011 | Zhang et al. |
| 2011/0037721 A1 | 2/2011 | Cranfill et al. |
| 2011/0043990 A1 | 2/2011 | Mickey et al. |
| 2011/0050946 A1 | 3/2011 | Lee et al. |
| 2011/0055407 A1 | 3/2011 | Lydon et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0081946 A1 | 4/2011 | Singh et al. |
| 2011/0102326 A1 | 5/2011 | Casparian et al. |
| 2011/0134032 A1 | 6/2011 | Chiu et al. |
| 2011/0157046 A1 | 6/2011 | Lee et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169762 A1 | 7/2011 | Weiss |
| 2011/0176035 A1 | 7/2011 | Poulsen |
| 2011/0179864 A1 | 7/2011 | Raasch et al. |
| 2011/0181754 A1 | 7/2011 | Iwasaki |
| 2011/0184646 A1 | 7/2011 | Wong et al. |
| 2011/0193787 A1 | 8/2011 | Morishige et al. |
| 2011/0199402 A1* | 8/2011 | Ishii ...................... G09G 3/002 345/690 |
| 2011/0205372 A1 | 8/2011 | Miramontes |
| 2011/0221659 A1 | 9/2011 | King, et al. |
| 2011/0227913 A1 | 9/2011 | Hyndman |
| 2011/0231682 A1 | 9/2011 | Kakish et al. |
| 2011/0234881 A1 | 9/2011 | Wakabayashi et al. |
| 2011/0248152 A1 | 10/2011 | Svajda et al. |
| 2011/0248920 A1 | 10/2011 | Larsen |
| 2011/0261001 A1 | 10/2011 | Liu |
| 2011/0261209 A1 | 10/2011 | Wu |
| 2011/0267272 A1 | 11/2011 | Meyer et al. |
| 2011/0290686 A1 | 12/2011 | Huang |
| 2011/0295697 A1 | 12/2011 | Boston et al. |
| 2011/0297566 A1 | 12/2011 | Gallagher et al. |
| 2011/0298919 A1 | 12/2011 | Maglaque |
| 2011/0304577 A1 | 12/2011 | Brown |
| 2011/0316807 A1 | 12/2011 | Corrion |
| 2011/0317991 A1* | 12/2011 | Tsai ...................... G03B 9/70 396/180 |
| 2012/0002052 A1 | 1/2012 | Muramatsu et al. |
| 2012/0007821 A1 | 1/2012 | Zaliva |
| 2012/0008015 A1 | 1/2012 | Manabe |
| 2012/0019686 A1 | 1/2012 | Manabe |
| 2012/0020556 A1 | 1/2012 | Manabe |
| 2012/0023459 A1 | 1/2012 | Westerman |
| 2012/0024682 A1 | 2/2012 | Huang et al. |
| 2012/0032891 A1 | 2/2012 | Parivar |
| 2012/0044179 A1 | 2/2012 | Hudson |
| 2012/0044379 A1 | 2/2012 | Manabe |
| 2012/0047368 A1 | 2/2012 | Chinn et al. |
| 2012/0050975 A1 | 3/2012 | Garelli et al. |
| 2012/0062736 A1 | 3/2012 | Xiong |
| 2012/0068919 A1 | 3/2012 | Lauder et al. |
| 2012/0075249 A1 | 3/2012 | Hoch |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0113579 A1 | 5/2012 | Agata et al. |
| 2012/0117409 A1 | 5/2012 | Lee et al. |
| 2012/0127118 A1 | 5/2012 | Nolting et al. |
| 2012/0133797 A1 | 5/2012 | Sato et al. |
| 2012/0140396 A1 | 6/2012 | Zeliff et al. |
| 2012/0145525 A1 | 6/2012 | Ishikawa |
| 2012/0162693 A1 | 6/2012 | Ito |
| 2012/0175487 A1 | 7/2012 | Goto |
| 2012/0182242 A1 | 7/2012 | Lindahl et al. |
| 2012/0194448 A1 | 8/2012 | Rothkopf |
| 2012/0224042 A1* | 9/2012 | Saijo ...................... H04N 5/2256 348/77 |
| 2012/0224073 A1 | 9/2012 | Miyahara |
| 2012/0229634 A1 | 9/2012 | Laett et al. |
| 2012/0246377 A1 | 9/2012 | Bhesania et al. |
| 2012/0249443 A1 | 10/2012 | Anderson et al. |
| 2012/0256959 A1 | 10/2012 | Ye et al. |
| 2012/0274811 A1 | 11/2012 | Bakin |
| 2012/0281129 A1 | 11/2012 | Wang et al. |
| 2012/0287218 A1 | 11/2012 | Ok |
| 2012/0300275 A1 | 11/2012 | Vilardell et al. |
| 2012/0312955 A1 | 12/2012 | Randolph |
| 2012/0330162 A1 | 12/2012 | Rajan et al. |
| 2013/0009413 A1 | 1/2013 | Chiu et al. |
| 2013/0027867 A1 | 1/2013 | Lauder et al. |
| 2013/0044074 A1 | 2/2013 | Park et al. |
| 2013/0063873 A1 | 3/2013 | Wodrich et al. |
| 2013/0067126 A1 | 3/2013 | Casparian et al. |
| 2013/0076617 A1 | 3/2013 | Csaszar et al. |
| 2013/0088431 A1 | 4/2013 | Ballagas et al. |
| 2013/0106766 A1 | 5/2013 | Yilmaz et al. |
| 2013/0128102 A1 | 5/2013 | Yano |
| 2013/0162554 A1 | 6/2013 | Lauder et al. |
| 2013/0172906 A1 | 7/2013 | Olson et al. |
| 2013/0217451 A1 | 8/2013 | Komiyama et al. |

(56) References Cited

U.S. PATENT DOCUMENTS

| | | |
|---|---|---|
| 2013/0222681 A1 | 8/2013 | Wan |
| 2013/0227836 A1 | 9/2013 | Whitt, III |
| 2013/0228023 A1 | 9/2013 | Drasnin |
| 2013/0228433 A1 | 9/2013 | Shaw |
| 2013/0228434 A1 | 9/2013 | Whitt, III |
| 2013/0228439 A1 | 9/2013 | Whitt, III |
| 2013/0229100 A1 | 9/2013 | Siddiqui |
| 2013/0229335 A1 | 9/2013 | Whitman |
| 2013/0229347 A1 | 9/2013 | Lutz, III |
| 2013/0229350 A1 | 9/2013 | Shaw et al. |
| 2013/0229351 A1 | 9/2013 | Whitt, III |
| 2013/0229354 A1 | 9/2013 | Whitt, III et al. |
| 2013/0229363 A1 | 9/2013 | Whitman |
| 2013/0229366 A1 | 9/2013 | Dighde |
| 2013/0229380 A1 | 9/2013 | Lutz, III |
| 2013/0229534 A1 | 9/2013 | Panay |
| 2013/0229568 A1 | 9/2013 | Belesiu et al. |
| 2013/0229570 A1 | 9/2013 | Beck et al. |
| 2013/0229756 A1 | 9/2013 | Whitt, III |
| 2013/0229757 A1 | 9/2013 | Whitt, III et al. |
| 2013/0229758 A1 | 9/2013 | Belesiu |
| 2013/0229759 A1 | 9/2013 | Whitt, III et al. |
| 2013/0229760 A1 | 9/2013 | Whitt, III |
| 2013/0229761 A1 | 9/2013 | Shaw |
| 2013/0229762 A1 | 9/2013 | Whitt, III |
| 2013/0229773 A1 | 9/2013 | Siddiqui |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler et al. |
| 2013/0232350 A1 | 9/2013 | Belesiu et al. |
| 2013/0232353 A1 | 9/2013 | Belesiu |
| 2013/0232571 A1 | 9/2013 | Belesiu |
| 2013/0262886 A1 | 10/2013 | Nishimura |
| 2013/0300590 A1 | 11/2013 | Dietz |
| 2013/0300647 A1 | 11/2013 | Drasnin |
| 2013/0301199 A1 | 11/2013 | Whitt |
| 2013/0301206 A1 | 11/2013 | Whitt |
| 2013/0304941 A1 | 11/2013 | Drasnin |
| 2013/0322000 A1 | 12/2013 | Whitt |
| 2013/0322001 A1 | 12/2013 | Whitt |
| 2013/0329360 A1 | 12/2013 | Aldana |
| 2013/0332628 A1 | 12/2013 | Panay |
| 2013/0339757 A1 | 12/2013 | Reddy |
| 2014/0012401 A1 | 1/2014 | Perek et al. |
| 2014/0043275 A1 | 2/2014 | Whitman |
| 2014/0048399 A1 | 2/2014 | Whitt, III |
| 2014/0055624 A1 | 2/2014 | Gaines |
| 2014/0119802 A1 | 5/2014 | Shaw |
| 2014/0125864 A1 | 5/2014 | Rihn |
| 2014/0313401 A1 | 10/2014 | Rihn et al. |

FOREIGN PATENT DOCUMENTS

| | | |
|---|---|---|
| EP | 1591891 | 11/2005 |
| EP | 2353978 | 8/2011 |
| GB | 2123213 | 1/1984 |
| JP | 56108127 | 8/1981 |
| JP | H104540 | 1/1998 |
| JP | 10326124 | 12/1998 |
| JP | 1173239 | 3/1999 |
| JP | 2001142564 | 5/2001 |
| JP | 2002300438 | 10/2002 |
| JP | 3602207 | 12/2004 |
| JP | 2006160155 | 6/2006 |
| JP | 2006294361 | 10/2006 |
| KR | 20050014299 | 2/2005 |
| KR | 102011008717 | 8/2011 |
| KR | 20110122333 | 11/2011 |
| WO | WO-0072079 | 11/2000 |
| WO | WO-2006044818 | 4/2006 |
| WO | WO-2010147609 | 12/2010 |

OTHER PUBLICATIONS

"Foreign Notice of Allowance", CN Application No. 201320097079.5, Apr. 1, 2016, 4 Pages.

"Foreign Office Action", CN Application No. 201310067603.9, Feb. 15, 2016, 12 Pages.

"Accessing Device Sensors", retrieved from <https://developer.palm.com/content/api/dev-guide/pdk/accessing-device-sensors.html> on May 25, 2012, 2011, 4 pages.

"Advanced Configuration and Power Management Specification", Intel Corporation, Microsoft Corporation, Toshiba Corp. Revision 1, Dec. 22, 1996, 364 pages.

"Advisory Action", U.S. Appl. No. 13/939,032, Feb. 24, 2014, 2 pages.

"Advisory Action", U.S. Appl. No. 14/199,924, May 28, 2014, 2 pages.

"Cirago Slim Case® —Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.

"Corrected Notice of Allowance", U.S. Appl. No. 13/470,633, Apr. 9, 2013, 2 pages.

"Corrected Notice of Allowance", U.S. Appl. No. 13/470,633, Jul. 2, 2013, 2 pages.

"Corrected Notice of Allowance", U.S. Appl. No. 13/563,435, Jan. 14, 2014, 2 pages.

"Corrected Notice of Allowance", U.S. Appl. No. 13/563,435, Mar. 20, 2014, 2 pages.

"Corrected Notice of Allowance", U.S. Appl. No. 13/563,435, Jan. 22, 2014, 2 pages.

"Corrected Notice of Allowance", U.S. Appl. No. 13/565,124, Apr. 3, 2014, 4 pages.

"Corrected Notice of Allowance", U.S. Appl. No. 13/565,124, Mar. 10, 2014, 2 pages.

"Corrected Notice of Allowance", U.S. Appl. No. 13/565,124, Apr. 14, 2014, 2 pages.

"Corrected Notice of Allowance", U.S. Appl. No. 13/651,327, Sep. 12, 2013, 2 pages.

"Corrected Notice of Allowance", U.S. Appl. No. 13/651,327, Sep. 23, 2013, 2 pages.

"Corrected Notice of Allowance", U.S. Appl. No. 13/651,726, Sep. 17, 2013, 2 pages.

"Corrected Notice of Allowance", U.S. Appl. No. 13/667,408, Jun. 24, 2014, 9 pages.

"Corrected Notice of Allowance", U.S. Appl. No. 13/938,930, May 6, 2014, 2 pages.

"Corrected Notice of Allowance", U.S. Appl. No. 13/938,930, Jun. 6, 2014, 2 pages.

"Corrected Notice of Allowance", U.S. Appl. No. 13/939,002, May 22, 2014, 2 pages.

"Corrected Notice of Allowance", U.S. Appl. No. 13/939,002, May 5, 2014, 2 pages.

"Final Office Action", U.S. Appl. No. 13/471,001, Jul. 25, 2013, 20 pages.

"Final Office Action", U.S. Appl. No. 13/471,054, Oct. 23, 2014, 17 pages.

"Final Office Action", U.S. Appl. No. 13/471,139, Sep. 16, 2013, 13 pages.

"Final Office Action", U.S. Appl. No. 13/471,336, Aug. 28, 2013, 18 pages.

"Final Office Action", U.S. Appl. No. 13/564,520, Jan. 15, 2014, 7 pages.

"Final Office Action", U.S. Appl. No. 13/651,195, Apr. 18, 2013, 13 pages.

"Final Office Action", U.S. Appl. No. 13/651,232, May 21, 2013, 21 pages.

"Final Office Action", U.S. Appl. No. 13/651,287, May 3, 2013, 16 pages.

"Final Office Action", U.S. Appl. No. 13/651,976, Jul. 25, 2013, 21 pages.

"Final Office Action", U.S. Appl. No. 13/653,321, Aug. 2, 2013, 17 pages.

(56) References Cited

OTHER PUBLICATIONS

"Final Office Action", U.S. Appl. No. 13/653,682, Jun. 11, 2014, 11 pages.
"Final Office Action", U.S. Appl. No. 13/653,682, Oct. 18, 2013, 16 pages.
"Final Office Action", U.S. Appl. No. 13/656,055, Oct. 23, 2013, 14 pages.
"Final Office Action", U.S. Appl. No. 13/780,228, Mar. 28, 2014, 13 pages.
"Final Office Action", U.S. Appl. No. 13/938,930, Nov. 8, 2013, 10 pages.
"Final Office Action", U.S. Appl. No. 13/939,002, Nov. 8, 2013, 7 pages.
"Final Office Action", U.S. Appl. No. 13/939,032, Dec. 20, 2013, 5 pages.
"Final Office Action", U.S. Appl. No. 14/063,912, Apr. 29, 2014, 10 pages.
"Final Office Action", U.S. Appl. No. 14/199,924, May 6, 2014, 5 pages.
"Final Office Action", U.S. Appl. No. 14/325,247, Apr. 16, 2015, 21 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"First One Handed Fabric Keyboard with Bluetooth Wireless Technology", Retrieved from: <http://press.xtvworld.com/article3817.html> on May 8, 2012, Jan. 6, 2005, 2 pages.
"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.
"Foreign Office Action", CN Application No. 201320097066.8, Oct. 24, 2013, 5 Pages.
"Foreign Office Action", CN Application No. 201320097079.5, Jul. 28, 2014, 4 pages.
"Foreign Office Action", CN Application No. 201320097079.5, Sep. 26, 2013, 4 pages.
"Foreign Office Action", CN Application No. 201320328022.1, Feb. 17, 2014, 4 Pages.
"Foreign Office Action", CN Application No. 201320328022.1, Oct. 18, 2013, 3 Pages.
"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.
"International Search Report and Written Opinion", Application No. PCT/US2013/028484, Jun. 24, 2014, 10 pages.
"International Search Report and Written Opinion", Application No. PCT/US2013/053683, Nov. 28, 2013, 11 pages.
"International Search Report and Written Opinion", Application No. PCT/US2013/028948, Jun. 21, 2013, 11 pages.
"International Search Report and Written Opinion", Application No. PCT/US2013/029461, Jun. 21, 2013, 11 pages.
"International Search Report and Written Opinion", Application No. PCT/US2013/040968, Sep. 5, 2013, 11 pages.
"International Search Report and Written Opinion", Application No. PCT/US2013/067912, Feb. 13, 2014, 12 pages.
"International Search Report and Written Opinion", Application No. PCT/US2013/042550, Sep. 24, 2013, 14 pages.
"Membrane Keyboards & Membrane Keypads", Retrieved from: <http://www.pannam.com/> on May 9, 2012, Mar. 4, 2009, 2 pages.
"Motion Sensors", Android Developers—retrieved from <http://developer.android.com/guide/topics/sensors/sensors_motion.html> on May 25, 2012, 2012, 7 pages.
"Non-Final Office Action", U.S. Appl. No. 13/599,635, Feb. 25, 2014, 13 pages.
"Non-Final Office Action", U.S. Appl. No. 13/468,918, Dec. 26, 2013, 18 pages.
"Non-Final Office Action", U.S. Appl. No. 13/471,001, Feb. 19, 2013, 15 pages.
"Non-Final Office Action", U.S. Appl. No. 13/471,030, May 15, 2014, 10 pages.
"Non-Final Office Action", U.S. Appl. No. 13/471,054, Mar. 13, 2015, 18 pages.
"Non-Final Office Action", U.S. Appl. No. 13/471,054, Jun. 3, 2014, 15 pages.
"Non-Final Office Action", U.S. Appl. No. 13/471,139, Mar. 21, 2013, 12 pages.
"Non-Final Office Action", U.S. Appl. No. 13/471,186, Feb. 27, 2014, 8 pages.
"Non-Final Office Action", U.S. Appl. No. 13/471,202, Feb. 11, 2013, 10 pages.
"Non-Final Office Action", U.S. Appl. No. 13/471,237, Mar. 24, 2014, 7 pages.
"Non-Final Office Action", U.S. Appl. No. 13/471,336, Jan. 18, 2013, 14 pages.
"Non-Final Office Action", U.S. Appl. No. 13/471,336, May 7, 2014, 17 pages.
"Non-Final Office Action", U.S. Appl. No. 13/471,376, Apr. 2, 2014, 17 pages.
"Non-Final Office Action", U.S. Appl. No. 13/471,405, Feb. 20, 2014, 37 pages.
"Non-Final Office Action", U.S. Appl. No. 13/492,232, Apr. 30, 2014, 9 pages.
"Non-Final Office Action", U.S. Appl. No. 13/527,263, Apr. 3, 2014, 6 pages.
"Non-Final Office Action", U.S. Appl. No. 13/527,263, Jul. 19, 2013, 5 pages.
"Non-Final Office Action", U.S. Appl. No. 13/563,435, Jun. 14, 2013, 6 pages.
"Non-Final Office Action", U.S. Appl. No. 13/564,520, Feb. 14, 2014, 5 pages.
"Non-Final Office Action", U.S. Appl. No. 13/564,520, Jun. 19, 2013, 8 pages.
"Non-Final Office Action", U.S. Appl. No. 13/565,124, Jun. 17, 2013, 5 pages.
"Non-Final Office Action", U.S. Appl. No. 13/593,066, Jan. 2, 2015, 11 pages.
"Non-Final Office Action", U.S. Appl. No. 13/651,195, Jan. 2, 2013, 14 pages.
"Non-Final Office Action", U.S. Appl. No. 13/651,232, Jan. 17, 2013, 15 pages.
"Non-Final Office Action", U.S. Appl. No. 13/651,232, Dec. 5, 2013, 15 pages.
"Non-Final Office Action", U.S. Appl. No. 13/651,272, Feb. 12, 2013, 10 pages.
"Non-Final Office Action", U.S. Appl. No. 13/651,287, Jan. 29, 2013, 13 pages.
"Non-Final Office Action", U.S. Appl. No. 13/651,304, Mar. 22, 2013, 9 pages.
"Non-Final Office Action", U.S. Appl. No. 13/651,327, Mar. 22, 2013, 6 pages.
"Non-Final Office Action", U.S. Appl. No. 13/651,726, Apr. 15, 2013, 6 pages.
"Non-Final Office Action", U.S. Appl. No. 13/651,871, Mar. 18, 2013, 14 pages.
"Non-Final Office Action", U.S. Appl. No. 13/651,871, Jul. 1, 2013, 5 pages.
"Non-Final Office Action", U.S. Appl. No. 13/651,976, Feb. 22, 2013, 16 pages.
"Non-Final Office Action", U.S. Appl. No. 13/653,321, Feb. 1, 2013, 13 pages.
"Non-Final Office Action", U.S. Appl. No. 13/653,682, Feb. 7, 2013, 11 pages.
"Non-Final Office Action", U.S. Appl. No. 13/653,682, Feb. 26, 2014, 10 pages.
"Non-Final Office Action", U.S. Appl. No. 13/653,682, Jun. 3, 2013, 14 pages.

(56) References Cited

OTHER PUBLICATIONS

"Non-Final Office Action", U.S. Appl. No. 13/656,055, Mar. 12, 2014, 17 pages.
"Non-Final Office Action", U.S. Appl. No. 13/656,055, Apr. 23, 2013, 11 pages.
"Non-Final Office Action", U.S. Appl. No. 13/780,228, Oct. 30, 2013, 12 pages.
"Non-Final Office Action", U.S. Appl. No. 13/938,930, Aug. 29, 2013, 9 pages.
"Non-Final Office Action", U.S. Appl. No. 13/939,002, Aug. 28, 2013, 6 pages.
"Non-Final Office Action", U.S. Appl. No. 13/939,002, Dec. 20, 2013, 5 pages.
"Non-Final Office Action", U.S. Appl. No. 13/939,032, Aug. 29, 2013, 7 pages.
"Non-Final Office Action", U.S. Appl. No. 14/063,912, Jan. 2, 2014, 10 pages.
"Non-Final Office Action", U.S. Appl. No. 14/199,924, Apr. 10, 2014, 6 pages.
"Non-Final Office Action", U.S. Appl. No. 14/200,595, Apr. 11, 2014, 4 pages.
"Non-Final Office Action", U.S. Appl. No. 14/325,247, Nov. 17, 2014, 15 pages.
"Notice of Allowance", U.S. Appl. No. 13/470,633, Mar. 22, 2013, 7 pages.
"Notice of Allowance", U.S. Appl. No. 13/471,139, Mar. 17, 2014, 4 pages.
"Notice of Allowance", U.S. Appl. No. 13/471,202, May 28, 2013, 7 pages.
"Notice of Allowance", U.S. Appl. No. 13/471,237, May 12, 2014, 8 pages.
"Notice of Allowance", U.S. Appl. No. 13/563,435, Nov. 12, 2013, 5 pages.
"Notice of Allowance", U.S. Appl. No. 13/565,124, Dec. 24, 2013, 6 pages.
"Notice of Allowance", U.S. Appl. No. 13/651,195, Jul. 8, 2013, 9 pages.
"Notice of Allowance", U.S. Appl. No. 13/651,232, Apr. 25, 2014, 9 pages.
"Notice of Allowance", U.S. Appl. No. 13/651,272, May 2, 2013, 7 pages.
"Notice of Allowance", U.S. Appl. No. 13/651,287, May 2, 2014, 6 pages.
"Notice of Allowance", U.S. Appl. No. 13/651,304, Jul. 1, 2013, 5 pages.
"Notice of Allowance", U.S. Appl. No. 13/651,327, Jun. 11, 2013, 7 pages.
"Notice of Allowance", U.S. Appl. No. 13/651,726, May 31, 2013, 5 pages.
"Notice of Allowance", U.S. Appl. No. 13/651,871, Oct. 2, 2013, 7 pages.
"Notice of Allowance", U.S. Appl. No. 13/653,321, Dec. 18, 2013, 4 pages.
"Notice of Allowance", U.S. Appl. No. 13/667,408, Mar. 13, 2014, 11 pages.
"Notice of Allowance", U.S. Appl. No. 13/938,930, Feb. 20, 2014, 4 pages.
"Notice of Allowance", U.S. Appl. No. 13/939,002, Mar. 3, 2014, 4 pages.
"Notice of Allowance", U.S. Appl. No. 13/939,032, Apr. 3, 2014, 4 pages.
"Notice of Allowance", U.S. Appl. No. 14/018,286, May 23, 2014, 8 pages.
"Notice of Allowance", U.S. Appl. No. 14/199,924, Jun. 10, 2014, 4 pages.
"Notice to Grant", CN Application No. 201320097089.9, Sep. 29, 2013, 2 Pages.
"Notice to Grant", CN Application No. 201320097124.7, Oct. 8, 2013, 2 pages.
"Position Sensors", Android Developers—retrieved from <http://developer.android.com/guide/topics/sensors/sensors_position.html> on May 25, 2012, 5 pages.
"Restriction Requirement", U.S. Appl. No. 13/468,918, Nov. 29, 2013, 6 pages.
"Restriction Requirement", U.S. Appl. No. 13/471,139, Jan. 17, 2013, 7 pages.
"Restriction Requirement", U.S. Appl. No. 13/593,066, Oct. 8, 2014, 8 pages.
"Restriction Requirement", U.S. Appl. No. 13/595,700, May 28, 2014, 6 pages.
"Restriction Requirement", U.S. Appl. No. 13/651,304, Jan. 18, 2013, 7 pages.
"Restriction Requirement", U.S. Appl. No. 13/651,726, Feb. 22, 2013, 6 pages.
"Restriction Requirement", U.S. Appl. No. 13/651,871, Feb. 7, 2013, 6 pages.
"Restriction Requirement", U.S. Appl. No. 14/325,247, Oct. 6, 2014, 6 pages.
"SolRxTM E-Series Multidirectional Phototherapy ExpandableTM 2-Bulb Full Body Panel System", Retrieved from: <http://www.solarcsystems.com/us_multidirectional_uv_light_therapy_1_intro.html> on Jul. 25, 2012, 2011, 4 pages.
"Supplemental Notice of Allowance", U.S. Appl. No. 13/653,321, Mar. 28, 2014, 4 pages.
"Supplemental Notice of Allowance", U.S. Appl. No. 14/018,286, Jun. 11, 2014, 5 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.
"Tilt Shift Lenses: Perspective Control", retrieved from http://www.cambridgeincolour.com/tutorials/tilt-shift-lenses1.htm, Mar. 28, 2008, 11 Pages.
"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.
"Welcome to Windows 7", Retrieved from: <http://www.microsoft.com/en-us/download/confirmation.aspx?id=4984> on Aug. 1, 2013, Sep. 16, 2009, 3 pages.
"What is Active Alignment?", http://www.kasalis.com/active_alignment.html, retrieved on Nov. 22, 2012, Nov. 22, 2012, 2 Pages.
Block,"DeviceOrientation Event Specification", W3C, Editor's Draft, retrieved from <https://developer.palm.com/content/api/dev-guide/pdk/accessing-device-sensors.html> on May 25, 2012, Jul. 12, 2011, 14 pages.
Brown,"Microsoft Shows Off Pressure-Sensitive Keyboard", retrieved from <http://news.cnet.com/8301-17938_105-10304792-1.html> on May 7, 2012, Aug. 6, 2009, 2 pages.
Butler,"SideSight: Multi-"touch" Interaction around Small Devices", In the proceedings of the 21st annual ACM symposium on User interface software and technology., retrieved from <http://research.microsoft.com/pubs/132534/sidesight_cry3.pdf> on May 29, 2012, Oct. 19, 2008, 4 pages.
Crider,"Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.
Dietz,"A Practical Pressure Sensitive Computer Keyboard", In Proceedings of UIST 2009, Oct. 2009, 4 pages.
Glatt,"Channel and Key Pressure (Aftertouch).", Retrieved from: <http://home.roadrunner.com/~jgglatt/tutr/touch.htm> on Jun. 11, 2012, 2012, 2 pages.
Hanlon,"ElekTex Smart Fabric Keyboard Goes Wireless", Retrieved from: <http://www.gizmag.com/go/5048/ > on May 7, 2012, Jan. 15, 2006, 5 pages.
Jacobs,"2D/3D Switchable Displays", In the proceedings of Sharp Technical Journal (4), Available at <https://cgi.sharp.co.jp/corporate/rd/journal-85/pdf/85-04.pdf>, Apr. 2003, pp. 15-18.

(56) References Cited

OTHER PUBLICATIONS

Kaur,"Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.

Khuntontong,"Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.

Linderholm,"Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.

McLellan,"Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.

Morookian,"Ambient-Light-Canceling Camera Using Subtraction of Frames", NASA Tech Briefs, Retrieved from <http://ntrs.nasa.gov/archive/nasa/casi.ntrs.nasa.gov/20110016693_2011017808.pdf>, May 2004, 2 pages.

Post,"E-Broidery: Design and Fabrication of Textile-Based Computing", IBM Systems Journal, vol. 39, Issue 3 & 4, Jul. 2000, pp. 840-860.

Prospero,"Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.

Purcher,"Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012, Jan. 12, 2012, 15 pages.

Takamatsu,"Flexible Fabric Keyboard with Conductive Polymer-Coated Fibers", In Proceedings of Sensors 2011, Oct. 28, 2011, 4 pages.

Zhang,"Model-Based Development of Dynamically Adaptive Software", In Proceedings of ICSE 2006, Available at <http://www.irisa.fr/lande/lande/icse-proceedings/icse/p371.pdf>, May 20, 2006, pp. 371-380.

"Supplemental Notice of Allowance", U.S. Appl. No. 13/471,054, Nov. 19, 2015, 2 pages.

"Notice of Allowance", U.S. Appl. No. 13/471,054, Sep. 25, 2015, 7 pages.

"Foreign Office Action", CN Application No. 201310067603.9, Oct. 17, 2016, 6 pages.

"Restriction Requirement", U.S. Appl. No. 14/792,154, Nov. 10, 2016, 7 pages.

\* cited by examiner

RAPID SYNCHRONIZED LIGHTING AND SHUTTERING

PRIORITY APPLICATION

This application is a divisional of U.S. patent application Ser. No. 14/325,247, filed on Jul. 7, 2014 which is a continuation of, and claims priority to U.S. patent application Ser. No. 13/667,408, filed Nov. 2, 2012, and entitled "Rapid Synchronized Lighting and Shuttering," the entire disclosures of which is hereby incorporated by reference.

BACKGROUND

Current imaging techniques have failed to adequately address undesired ambient light. Some partial but inadequate solutions have been devised, including drowning out ambient light using a very bright light. This partial solution, however, often requires a brighter illuminant than is practical, higher power usage than is desired, or creates undesirably high heat. Also, it fails to handle very bright ambient light, such as outdoor scenes on a sunny day or when imaging a gesture made over a bright computer screen. Other partial but inadequate solutions include spectral approaches in which an object is illuminated with a narrow-frequency light and then band-pass filtering the image. This approach can fail due to the narrow-frequency lighting device drifting out of the narrow-frequency band.

Another partial but inadequate solution involves capturing an image with a light on, then another image with the light off, and then subtracting the ambient background light to provide an image having only the provided light. This solution, however, fails to address the ambient light changing or the image changing, such as when an object in the imaging area is moving. These problems can be addressed somewhat through complex and resource-intensive processing of the images and a fast camera, though the processing is computationally expensive and these fast cameras are also costly and often large and heavy as well. Further, even with this processing and fast camera, motion artifacts cannot be completely addressed.

SUMMARY

This document describes various apparatuses and techniques for rapid synchronized lighting and shuttering. These apparatuses and techniques are capable of capturing two images, where one of the images integrates multiple exposures during which an image area is illuminated by a light source and another of the images integrates multiple exposures during which the image is not illuminated by the light source. The image area can be illuminated by rapidly flashing the image area with the light source and synchronizing a shutter to permit one image sensor to capture an image when the image area is illuminated and another image sensor to capture the image area when the image area is not illuminated. These two images can be captured concurrently or nearly concurrently, thereby reducing or eliminating motion artifacts. Further, these apparatus and techniques may do so with slow and relatively low-cost cameras and relatively low computational costs.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes various apparatuses and techniques for rapid synchronized lighting and shuttering. Various embodiments of these techniques and apparatuses enable subtraction of ambient or other light with little or no motion artifacts, using relatively slow image sensors, and/or with relatively low usage of computational resources.

In some embodiments, for example, a camera system having two slow frame-rate image sensors capable of capturing an image 60 or fewer times per second, a light source that rapidly flashes an object, and shutters synchronized with the flashes enables one of the image sensors to receive light from the image area when the image area is illuminated by the light source and the other of the image sensors to receive light from the image area when the image area is not illuminated by the light source (assuming the shutters integrating the two sensors are synchronized). The image sensors may have a slow frame rate, which often results in the image sensors being small and inexpensive, without negatively affecting the techniques' ability to subtract ambient light as noted in part above. With these two images, a net image can be calculated that subtracts out ambient or other sources of light.

The described apparatuses and techniques, however, enable relatively slow frame-rate image sensors, in conjunction with synchronized light sources and shutters, to gain a resiliency to motion artifacts. This resiliency can be equal to fast frame-rate image sensors operating at a frame-rate of the shutters of the slow frame-rate image sensors that follow the described techniques. By so doing, the apparatus and techniques may be less costly and require lower computing and video bandwidth for similar or even superior resiliency to motion artifacts.

Example Environment

Figure 1:
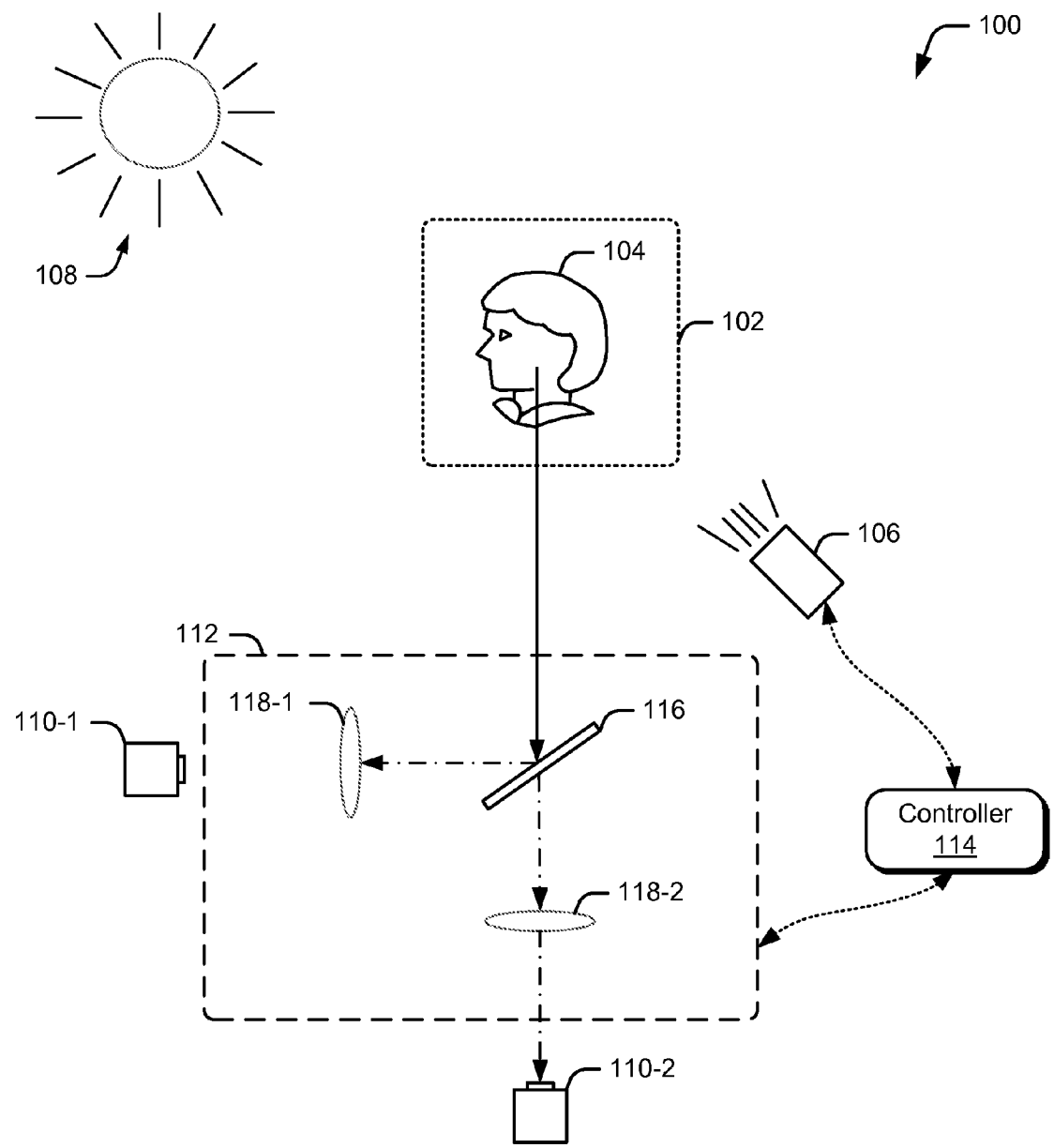
FIG. 1 illustrates an example environment in which the techniques may be implemented and the apparatus may be embodied.

FIG. 1 is an illustration of an example environment 100 in which rapid synchronized lighting and shuttering can be implemented. Environment 100 includes an image area 102 having an object 104 (a person's head), a light source 106, ambient light 108, image sensors 110, a shutter system 112, and a controller 114.

Image area 102 is an area of which an image will be captured by image sensors 110, such as a moving hand, person, or object, as well as unmoving parts of the area. For example, image area 102 may be actors in a studio performing a comedy, a persons' hand performing a gesture over a lighted computer screen, a person moving his arms to control a game, or a wildlife scene of a butterfly landing on a flower.

Light source 106 is capable of illuminating image area 102 with rapidly flashing light. This rapid flashing can be random, regular, patterned, periodic, or coded in various manners, and is capable of illuminating image area 102 at a flash rate twice as fast (or faster) as an image-capture-rate of image sensors 110. Further, light source 106 illuminates image area 102 some fraction of an amount of time in which image sensors 110 are exposed, such as ¼, ¼, ¼, ⅔, ¾, and so forth, depending on various factors set forth elsewhere herein. Light source 106 can include light-emitting-diodes (LEDs), laser diodes, and other types of lighting elements. Light source 106 can provide various frequencies of light, such as infrared, narrow-band, white, and so forth.

Ambient light 108 can be any type of light, such as light within an office building (e.g., fluorescent, incandescent, and/or natural light through glass, each alone or in combination), lighting in a television studio, light from a computer screen, or light from the sun or moon (direct, reflected, and/or refracted), to name just a few.

Image sensors 110, marked as first image sensor 110-1 and second image sensor 110-2 in FIG. 1, can be of various types and image-capturing rates. Thus, they can be relatively slow and inexpensive digital image sensors (e.g., those having a frame rate that is 60 times per second or slower), fast and expensive digital image sensors (those having a frame rate greater than at least 60 times per second, such as 100, 240, 1000, and 2000), analog sensors, and so forth. Image sensors 110 may have a slow image-capture-rate that is half or slower than half the speed of flashes of light from light source 106, though this is not required. They may also include or exclude a shutter, which may be a rolling shutter or global shutter, which can be synchronized with the other image sensor. This shutter, which may be included with the image sensor, is not a shutter of shutter system 112.

Shutter system 112 is capable of shuttering as fast as, and being synchronized with (or vice-a-versa), the flash rate and pattern of light source 106 and/or other light sources set forth elsewhere herein. Shutter system 112 is capable of preventing one of image sensors 110 from being exposed to light from light source 106 while exposing at least one other image sensor 110 to that light.

In embodiment 100 of FIG. 1, shutter system 112 includes a beam splitter 116, one or more polarizers (not shown), and one or more ferro-electric polarization retarders 118. Beam splitter 116 can be a silvered mirror, a dual brightness film (DBEF) sheet, or other device capable of splitting or directing light. Ferro-electric polarization retarders 118 act to prohibit one of image sensors 110 from being exposed to polarized light from image area 102 by cancelling that light while passing light to another of image sensors 110 to be exposed to polarized light from image area 102. Thus, light from light source 106 is flashed, illuminating image area 102, such as a person's head (object 104), the light reflects off of image area 102, is received and split by beam splitter 116, is polarized by one or more polarizers, and then is canceled or passed by ferro-electric polarization retarders 118. Here ferro-electric polarization retarders 118 (marked "118-1" and "118-2") are rotated 90 degrees effective to pass or cancel received, polarized light. Note, however, that other embodiments of shutter system 112 may be used, such as fast mechanical shutters.

Generally, controller 114 is capable of controlling and synchronizing shutters and lighting of image area 102. In some embodiments, controller 114 is capable of flashing light source 106 and shuttering shutters of shuttering system 112 effective to enable image sensor 110-1 to capture a first image integrating multiple exposures during which light source 106 is flashed and to enable image sensor 110-2 to capture a second image integrating multiple exposures during which light source 106 is not flashed. Thus, controller 114 can cause shutters of shuttering system 112 to expose or pass light synchronously with illuminations of image area 102 by light source 106.

Further, in some embodiments controller 114 is capable of coding or patterning the flashing of flashing light source 106 to address particular kinds of ambient light. Consider a case where image area 102 is indoors and exposed to fluorescent ambient light. Fluorescent lights and some other types of light are not steady, though they may appear so. Instead, some types of lights flicker, such as at twice the supply frequency, e.g., fluorescent light sources may "flicker" at 50 Hz to 120 Hz, for example, which many people cannot see. Controller 114 determines the pattern of the fluorescent's illumination with various sensors (not shown), and thereby determines the rate and regularity at which the ambient light flickers. Controller 114 may then code the flashing of flashing light source 106 to this pattern of light flickering. This is but one way in which the apparatuses and techniques may avoid interference from ambient light.

These example embodiments are not intended to limit application of controller 114. Ways in which controller 114 acts and interacts, including with elements described in FIG. 1, are set forth in additional and greater detail below.

Figure 2:
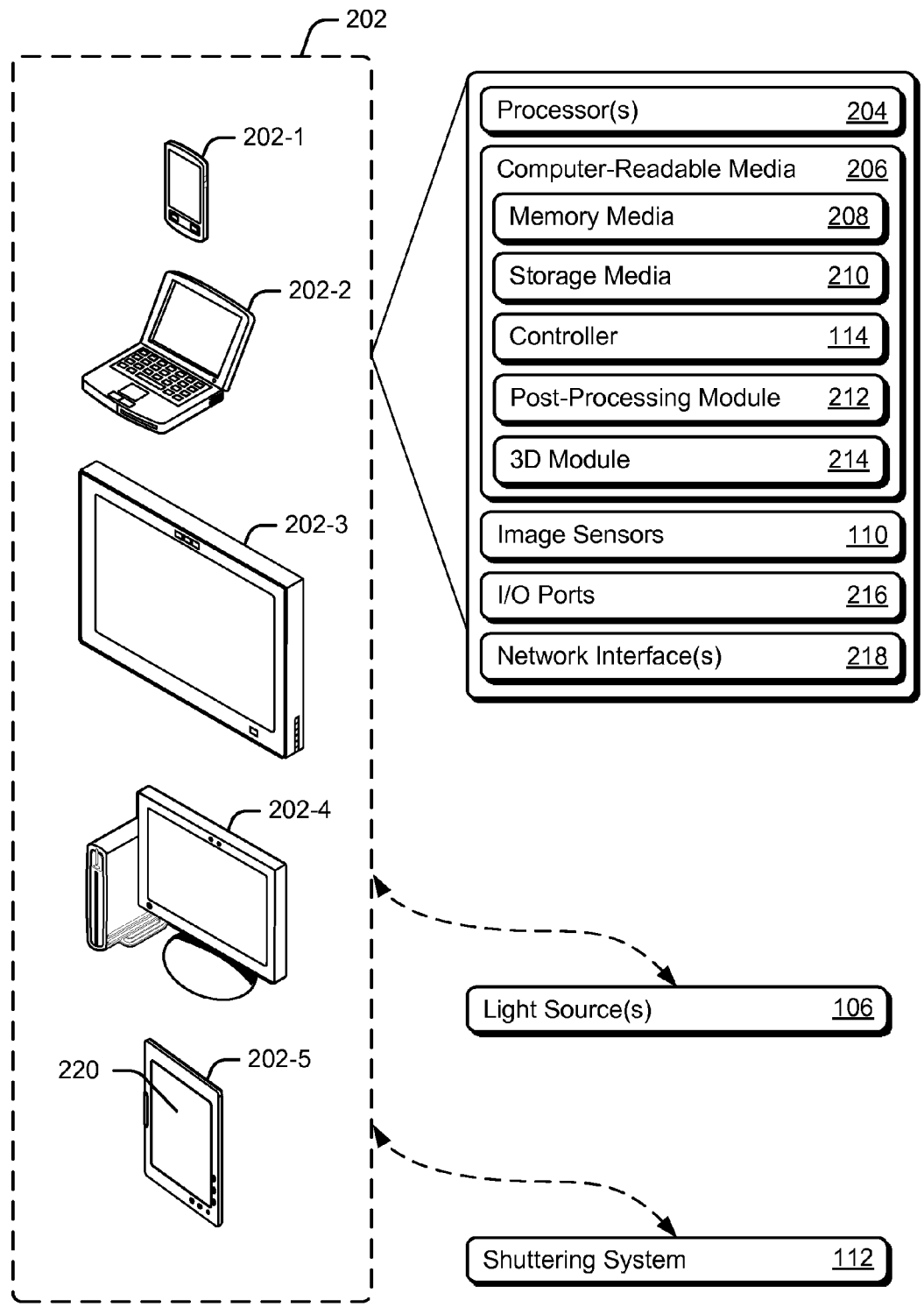
FIG. 2 illustrates an example computing device in which the controller of FIG. 1 may be embodied.

FIG. 2 illustrates a computing device 202 in which controller 114 may be embodied. Computing device 202 is illustrated with various non-limiting example devices: smartphone 202-1, laptop 202-2, television 202-3, desktop 202-4, and tablet 202-5. Computing device 202 includes processor(s) 204 and computer-readable media 206, which includes memory media 208 and storage media 210. Applications and/or an operating system (not shown) embodied as computer-readable instructions on computer-readable memory 206 can be executed by processor(s) 204 to provide some or all of the functionalities described herein. Computer-readable media 206 also includes controller 114, image post-processing module 212, and three-dimension (3D) module 214.

Computing device 202 also includes, or is in communication with, image sensors 110, input/output (I/O) ports 216, and network interface(s) 218. Image sensors 110 capture images as noted herein, and may be separate or integral with computing device 202. In some cases image sensors 110 can be used to capture gestures made near a lighted computer display, such as display 220 of tablet 202-5 or in proximity to a computing device, such as desktop 202-4 for larger gestures (like arm and body movements).

Captured images are received by computing device 202 from image sensors 110 via the one or more I/O ports 216. I/O ports 216 enable interaction generally between controller 114 and light source 106, shuttering system 112, and image sensors 110. I/O ports 216 can include a variety of ports, such as by way of example and not limitation, high-definition multimedia (HDMI), digital video interface (DVI), display port, fiber-optic or light-based, audio ports (e.g., analog, optical, or digital), USB ports, serial advanced technology attachment (SATA) ports, peripheral component interconnect (PCI) express based ports or card slots, serial ports, parallel ports, or other legacy ports.

Computing device 202 may also include network interface(s) 218 for communicating data over wired, wireless, or optical networks. Data communicated over such networks may include control data from controller 114, timing, sequences, coding, and the like to or from light source 106 and shuttering system 112. By way of example and not limitation, network interface 218 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Example Methods

Figure 3:
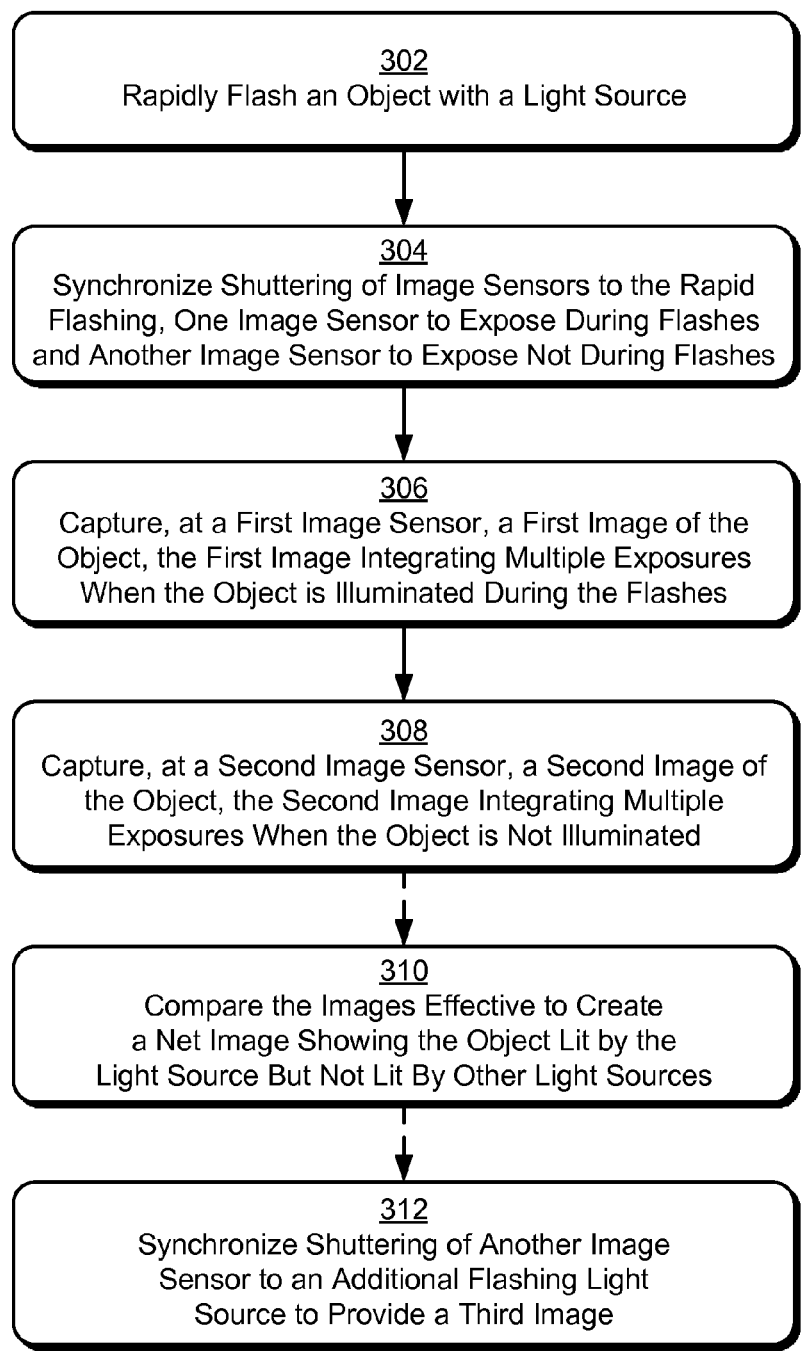
FIG. 3 is a flow diagram depicting example methods for rapid synchronized lighting and shuttering, including optional image comparison and use of an optional additional flashing light source.

FIG. 3 is flow diagram depicting example methods 300 for rapid synchronized lighting and shuttering.

Block 302 rapidly flashes an object with a first light source, the object illuminated by a second light source in addition to the first light source. As noted in part above, this second light source can be ambient light. This second light source, however, may also or instead include another flashing light source. Use of other flashing light sources is set forth in greater detail elsewhere herein.

Block 304 synchronizes shuttering to expose and not expose different image sensors to the rapid flashing, the synchronized shuttering exposing a first image sensor during the flashes and a second image sensor not during the flashes. By way of example, consider a case where controller 114 synchronizes mechanical shutters to open one shutter prior to or during each flash and close prior to or during each flash (this first mechanical shutter is optically interposed between the object and the first image sensor). Controller 114 also synchronizes another mechanical shutter to open when or after each flash ceases and close prior to or when each flash begins (this second mechanical shutter is optically interposed between the object and the second image sensor).

Figure 4:
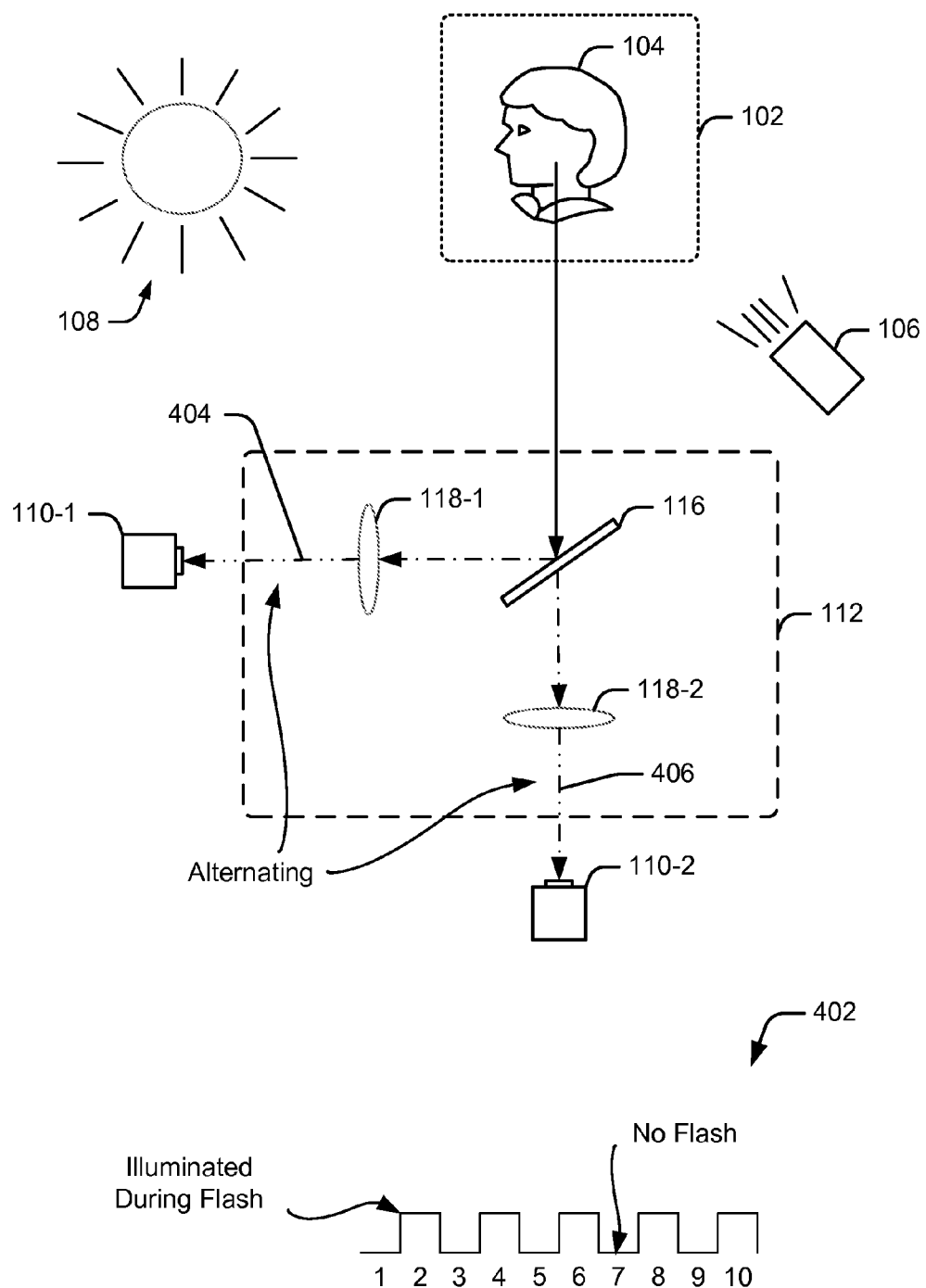
FIG. 4 illustrates the environment of FIG. 1 along with some elements in greater detail as well as a flash graph showing times at which an image area is and is not illuminated.

By way of another example, consider FIG. 4, which illustrates some of the elements of FIG. 1 but in greater detail. Controller 114 (not shown) causes light source 106 to flash image area 102 and object 104 at times 2, 4, 6, 8, and 10 (shown at flash graph 402, each time representing one millisecond). No flashes from light source 106 are present at times 1, 3, 5, 7, and 9, though image area 102 is illuminated by ambient light 108 at these times. Controller 114 controls shutter system 112 by rotating ferro-electric polarization retarders 118-1, 118-2 effective to pass or block polarized light to image sensor 110-1, 110-2, respectively, at each of times 1 through 10. Note that the light that exposes image sensors 110 alternates based on when image area 102 is illuminated, shown at flash exposure light 404 and non-flash exposure light 406.

Block 306 captures, at the first image sensor, a first image of the object, the first image integrating multiple exposures during which the object is illuminated by the first light source during multiple, respective flashes and during which the object is also illuminated by the second light source.

Returning to the ongoing example of FIG. 4, image sensor 110-1 is exposed, for a single image, at times 2, 4, 6, 8, and 10, while image sensor 110-2 is exposed, also for a single image, at times 1, 3, 5, 7, and 9. As noted above, each of the images captured are exposed multiple times (here five), though as few as two or many more than five exposures can be made for each image. This is, or can be, a function of the image-capture rate of the image sensors. Thus, in those cases where an image sensor having a fast-image-capture-rate is practical, the number of exposures per image may be lower. A fast camera having an image capture rate of 240 images per second combined with a shutter system and light source capable of being synchronized by a controller for 960 flashes and shuttering 960 times per second, the images captured may have four exposures (960/240=4).

Block 308 captures, at the second image sensor, a second image of the object, the second image integrating multiple exposures during which the object is not illuminated by the first light source but is illuminated by the second light source. For the ongoing example, image sensor 110-2 is exposed five times for a single image captured, the five times when object 104 is not illuminated by light source 106 but is illuminated by ambient light 108.

Block 310 compares the first image and the second image effective to create a net image, the net image showing the object illuminated by the first light source but not illuminated by the second light source. This first light source flashes image area 102 but the second light source is not necessarily ambient light 108. Instead, other flashing light sources may be those excluded or removed to provide a net image. Furthermore, block 310 is not necessarily performed by controller 114. In some cases, controller 114 of FIGS. 1 and 2 provides the first image and the second image in a format usable by post-processing module 212 and/or 3D module 214 to determine the net image.

As noted in part above, first and second images captured during methods 300 can be captured concurrently or nearly concurrently. Image sensor 110-1 and image sensor 110-2 can be capturing images concurrently at the start of time 1 of graph 402 of FIG. 4. In such a case, image sensor 110-2, while available to receive light, may not actually receive the light, as its ferro-electric polarization retarder 118-2 will not pass light from beam splitter 116 at time 1. Still, both image sensors 110-1 and 110-2 are attempting to capture an image. Both image sensors 110-1 and 110-2 may send the captured image at the end of time 10 of graph 402 and then proceed to start again at a new cycle of flashes. As shown in FIG. 4, the exposures are interleaved during the same time period, here times 1 to 10 of graph 402 (here a total time period of 10 milliseconds).

Additionally and optionally, block 312 may synchronize shuttering of other image sensors to an additional flashing light source to provide one or more additional images. Capture of additional images can be interleaved with capture of images one and two.

Figure 5:
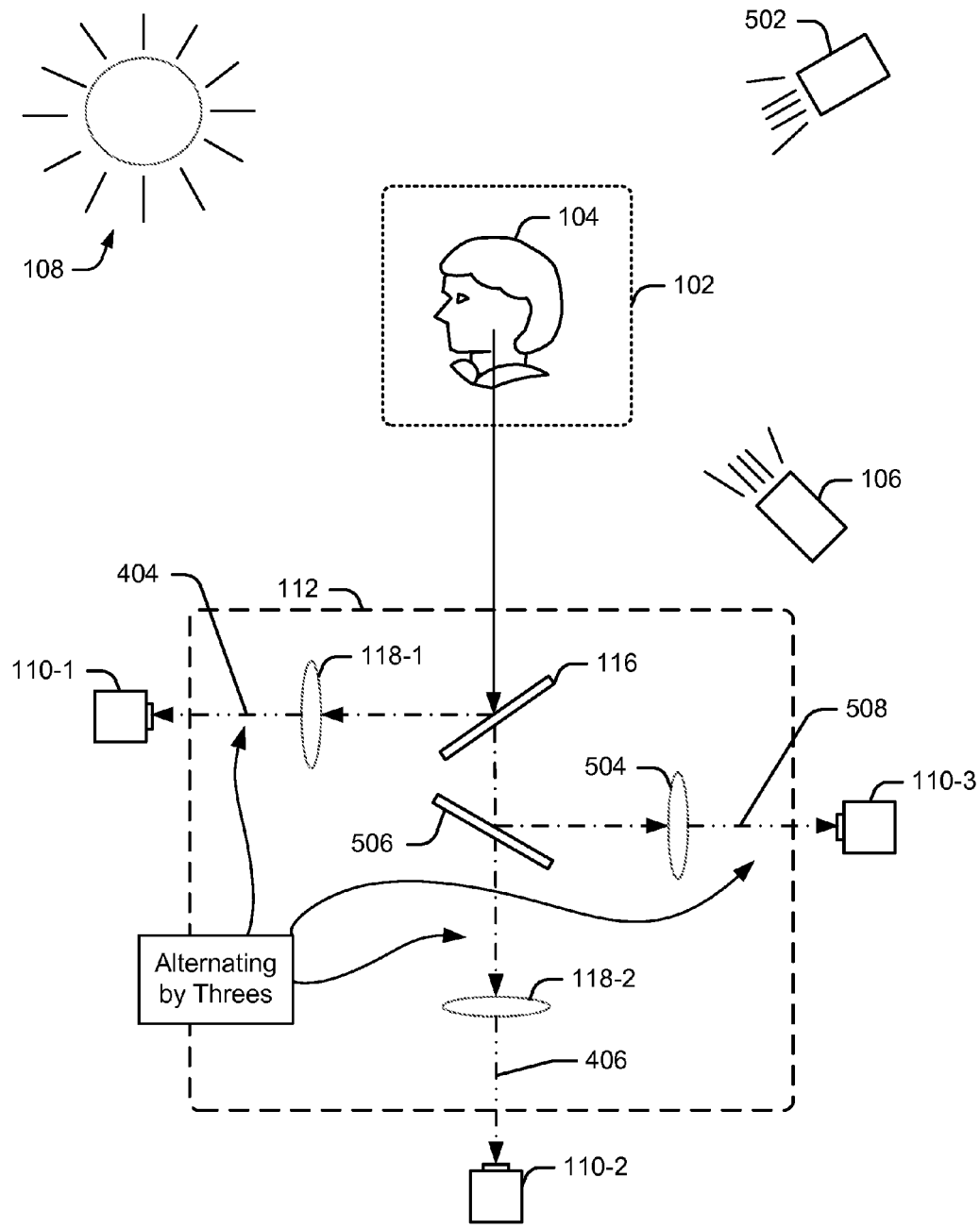
FIG. 5 illustrates the environment of FIG. 1 along with additional elements for capturing one or more additional images.

By way of example, consider FIG. 5, which illustrates the elements of FIG. 1 along with additional elements for capturing one or more additional images. Each additional image can be used to determine placement of objects or other uses. Placement of objects can aid in 3D applications. In this example, a light source 502 flashes at the flash rate of light source 106 (or faster) and shuttering system 112 of FIG. 5 shutters at the rate of light source 502 using an additional shutter 504 (here also a ferro-electric polarization retarder). Controller 114 (not shown) is capable of synchronizing flashing of light source 502 and shuttering of additional shutter 504 effective to enable image sensor 110-1 and image sensor 110-2, or image sensor 110-3 and a fourth image sensor paired with image sensor 110-3 (not shown), to capture images integrating multiple exposures during which light source 502 is flashed.

While not shown, other image sensors may be used, such as one to capture another image when object 104 is exposed to ambient but no other light sources, or other images to capture images when flashed with still further flashing light sources. Note that light source 502 illuminates image area 102 from a different direction than light source 106 effective to provide a shadow of object 104. This difference in direction changes shadows of object 104, which can aid in 3D applications as noted herein, such as when object 104 is moving and thus its location is tracked through this movement based on the shadows. As noted in part above, additional images sensors may be used for 3D applications, though these additional image sensors are not necessarily required, as images can be captured by image sensors 110-1 and 110-2 that are illuminated by additional lights sources and thus have different shadowing.

Figure 6:
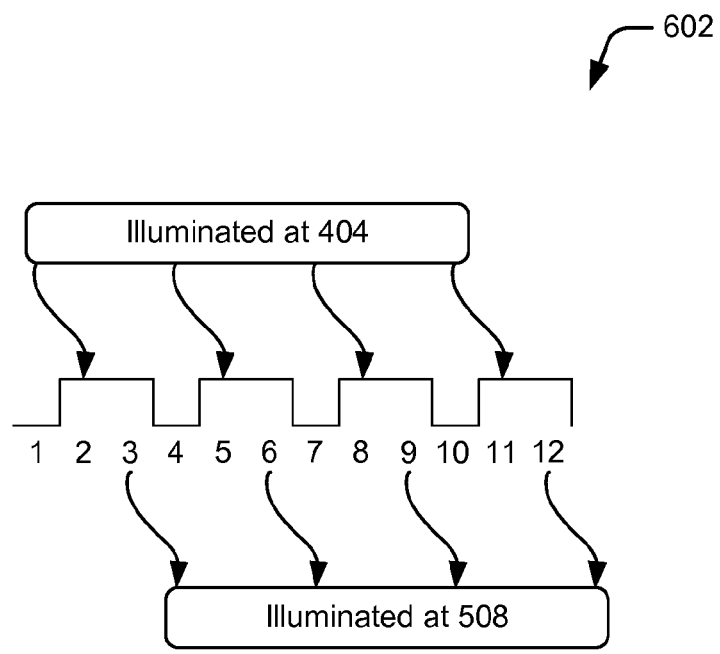
FIG. 6 illustrates an example multi-light-source flash graph showing different times at which multiple light sources illuminate the image area.

In more detail, at FIG. 5 assume that controller 114 causes light source 106 to flash image area 102 and object 104 at times 1, 4, 7, and 10, causes light source 502 to flash at times 2, 5, 8, and 11, and ceases flashing at times 3, 6, 9, and 12 (image area 102 may still be illuminated by ambient light 108). This timing is shown at multi-light-source flash graph 602 in FIG. 6. This is but one example of ways in which controller 114 may code flashing of light sources so that they do not interfere with each other.

This example pattern is not required, however. Controller 114 may instead flash light source 106 at times 1, 5, and 9, another light source at times 3 and 7, and use (or avoid exposure during) times 2, 4, 6, and 8 based on a determined flicker of a fluorescent ambient light at times 2, 4, 6, and 8, for example. Other ways of coding one or more light sources are described elsewhere herein.

Light passes to beam splitter 116 and then to ferro-electric polarization retarder 118-1 (associated with image sensor 110-1) and a second beam splitter 506. From second beam splitter 506, light passes to ferro-electric polarization retarder 118-2 (associated with image sensor 110-2) and additional shutter 504, after which second-flash-exposure light 508 may pass to image sensor 110-3. Note that the light that exposes image sensors 110 alternates by threes based on when image area 102 is illuminated, shown at flash exposure light 404, non-flash exposure light 406, and second-flash-exposure light 508.

Figure 7:
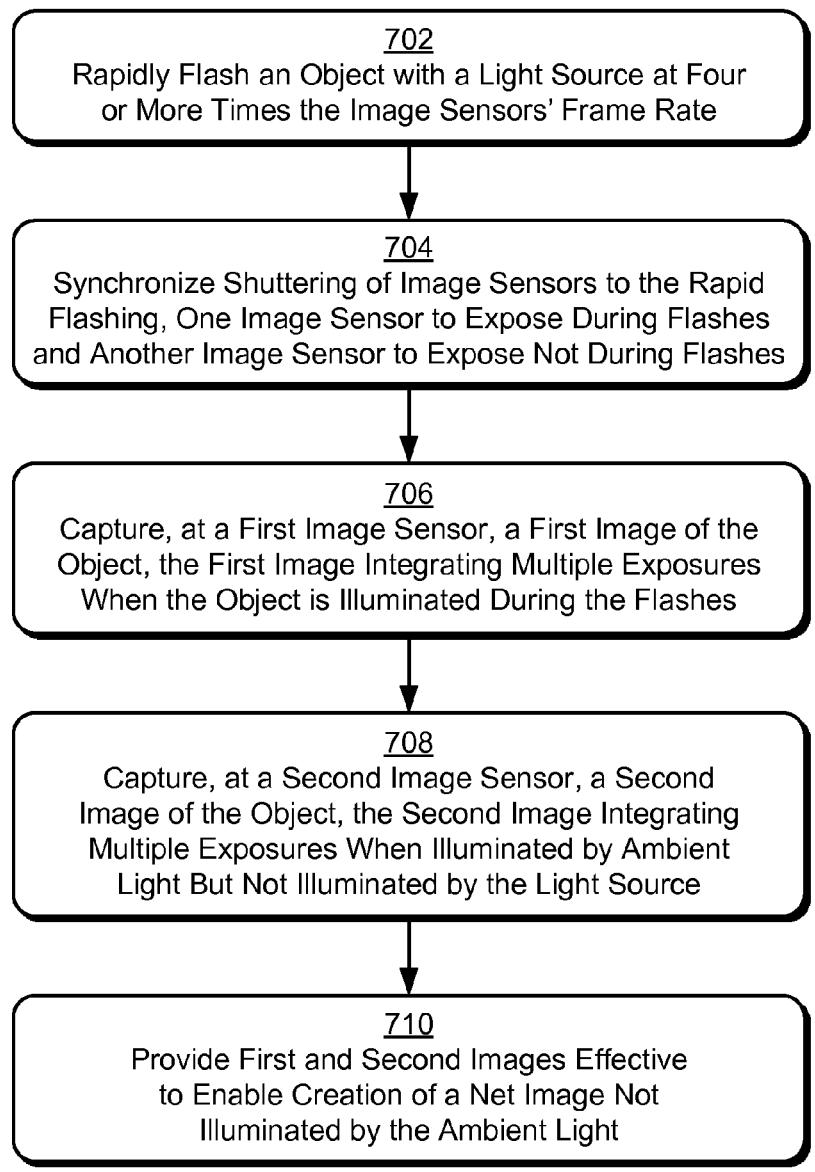
FIG. 7 is a flow diagram depicting example methods for rapid synchronized lighting and shuttering effective to enable creation of a net image not illuminated by ambient light.

FIG. 7 is flow diagram depicting example methods 700 for rapid synchronized lighting and shuttering effective to enable creation of a net image not illuminated by ambient light. Methods 700 may be performed by controller 114 of FIG. 1, whether operating through software, hardware, or a combination thereof.

Block 702 rapidly flashes an object with a first light source, the object illuminated by ambient light in addition to the first light source. This rapid flashing is a multiple of the image sensors' frame rate, such as four or six times this frame rate. Thus, assuming that the image sensors' frame rate is eight, controller 114 flashes the object with light source 106 32 times per second at a four multiple flash rate.

Block 704 synchronizing shuttering of image sensors to the rapid flashing, the synchronized shuttering exposing a first image sensor during the flashes and a second image sensor not during the flashes.

Block 706 captures, at the first image sensor, a first image of the object, the first image integrating two or more exposures during which the object is illuminated by the first light source during multiple, respective flashes and during which the object is also illuminated by the ambient light.

Block 708 captures, at the second image sensor, a second image of the object, the second image integrating two or more exposures during which the object is not illuminated by the first light source but is illuminated by the ambient light.

Block 710 provides the first image and the second image effective to enable creation of a net image, the net image showing the object illuminated by the first light source but not illuminated by the ambient light.

Any of the methods set forth herein may provide images to a third party to create a net image or may create the net image internally, such as by post-processing module 212 of FIG. 1. Further, these methods may be used not only for large moving objects in natural light, such as persons walking outside, but also for small objects in other types of light. Thus, the methods may be used to flash a hand, finger, or stylus. The net image of this moving hand, finger, or stylus, may be effective to enable determination of a gesture performed by the hand, the finger, or the stylus, such as over a computer screen or in front of a television. This determination can be made by computing device 202, with which a person is interacting through the gesture, thereby enabling the television, tablet, or smart phone, for example, to determine gestures made even when illuminated by ambient light from a bright computer screen or television.

Note that various blocks of methods 300 and/or 700 may be repeated effective to continually provide images by which ambient light may be removed and/or locations be determined (whether for 3D applications, gesture recognition, or otherwise), among other applications.

The preceding discussion describes methods in which the techniques for rapid synchronized lighting and shuttering may be performed. These methods are shown as sets of blocks that specify operations performed but are not necessarily limited to the order shown for performing the operations by the respective blocks.

Aspects of these methods may be implemented in hardware (e.g., fixed logic circuitry), firmware, a System-on-Chip (SoC), software, manual processing, or any combination thereof. A software implementation represents program code that performs specified tasks when executed by a computer processor, such as software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Device

Figure 8:
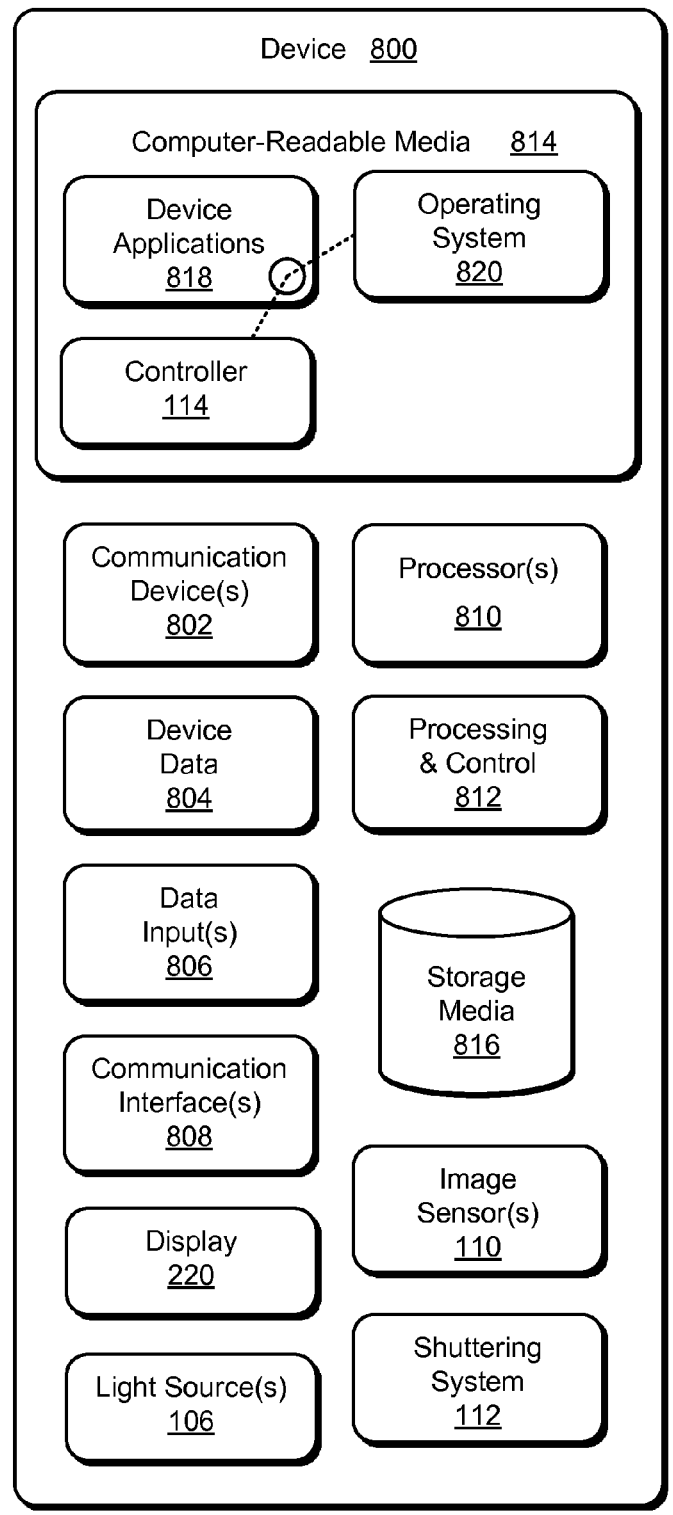
FIG. 8 illustrates an example device in which techniques for rapid synchronized lighting and shuttering can be implemented.

FIG. 8 illustrates various components of example device 800 that can be implemented as any type of client, server, and/or display device as described with reference to the previous FIGS. 1-7 to implement techniques for rapid synchronized lighting and shuttering. In embodiments, device 800 can be implemented as one or a combination of a wired and/or wireless device, as a form of flat panel display, television, television client device (e.g., television set-top box, digital video recorder (DVR), etc.), consumer device, computer device, server device, portable computer device, viewer device, communication device, video processing and/or rendering device, appliance device, gaming device, electronic device, and/or as another type of device. Device 800 may also be associated with a viewer (e.g., a person or user) and/or an entity that operates the device such that a device describes logical devices that include viewers, software, firmware, and/or a combination of devices.

Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a viewer of the device. Media content stored on device 800 can include any type of audio, video, and/or image data. Device 800 includes one or more data inputs 806 via which any type of data, media content, and/or inputs can be received, such as viewer-selectable inputs, position changes of a viewer, messages, music, television media content, recorded video content, and any other type of audio, video, and/or image data received from any content and/or data source.

Device 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like), which process various computer-executable instructions to control the operation of device 800 and to enable techniques for rapid synchronized lighting and shuttering. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), non-volatile RAM (NVRAM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable storage media 814 provides data storage mechanisms to store the device data 804, as well as various device applications 818 and any other types of information and/or data related to operational aspects of device 800. For example, an operating system 820 can be maintained as a computer application with the computer-readable storage media 814 and executed on processors 810. The device applications 818 may include a device manager, such as any form of a control application, software application, signal-processing and control module, code that is native to a particular device, a hardware abstraction layer for a particular device, and so on. The device applications 818 also include any system components or modules to implement these described techniques. In this example, the device applications 818 can include controller 114.

Furthermore, device 800 may include or be capable of communication with display 220, image sensors 110, light sources 106, and shuttering system 112.

CONCLUSION

This document describes various apparatuses and techniques for rapid synchronized lighting and shuttering. This rapid synchronized lighting and shuttering permits images without ambient or other undesired light to be created with little or no motion artifacts. Further, these apparatus and techniques may do so with slow and relatively low-cost cameras and relatively low computational costs. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   a controller configured to:
      synchronize flashing of a first light source and a second light source and shuttering of a shutter effective to capture a first image integrating multiple exposures during which the first light source is flashed and a second image integrating multiple exposures during which the second light source is flashed; and
      provide the first image and the second image, the first image and the second image are processed to determine a position or location of an object captured in the first image and the second image.

2. A system as recited in claim 1, wherein the first light source illuminates the object from a different direction than the second light source.

3. A system as recited in claim 2, wherein the first image and the second image are processed to determine a position or location of an object captured in the first image and the second image by comparing a first shadow of the object as illuminated by the first light source in the first image and a second shadow of the object as illuminated by the second light source in the second image.

4. A system as recited in claim 3, wherein the object is moving and its location is tracked through the movement based on shadows of the object as illuminated by the first light source and the second light source.

5. A system as recited in claim 3, wherein the object is a finger, hand, arm, body, or stylus performing a gesture and the position or location of the object is processed for three-dimensional gesture recognition.

6. A system as recited in claim 1, further configured to:
   capture a third image through the synchronized shuttering in which the object is not illuminated by the first light source or the second light source; and
   provide the third image with the first image and the second image.

7. A system as recited in claim 1, wherein the first light source and the second light source are LEDs or laser diodes and a flash rate of the LEDs or laser diodes is at least 60 Hz.

8. A system as recited in claim 7, wherein the flash rate of the LEDs or laser diodes is at least twice as fast as an image-capture rate at which the first and second images are captured.

9. A system as recited in claim 8, wherein the controller is further configured to synchronize the shuttering of the shutter at a shuttering rate at least as fast as the flash rate.

10. A system as recited in claim 1, wherein the shutter includes a beam splitter, a polarizer, and a ferro-electric polarization retarder and the controller is further configured to control the beam splitter, the polarizer, and the ferroelectric polarization retarder as part of synchronizing the flashing of the first light source and the second light source and the shuttering of the shutter.

11. A system as recited in claim 1, wherein the controller is configured to synchronize flashing of the first light source and the second light source and shuttering of the shutter effective to capture of the first image by a first image sensor and capture of the second image by a second image sensor.

12. A method comprising:
rapidly flashing an object with a first light source and a second light source;
synchronizing shuttering of a first shutter to the rapid flashing of the first light source effective to enable capture a first image integrating multiple exposures;
synchronizing shuttering of a second shutter to the rapid flashing of the second light source effective to enable capture of a second image integrating multiple exposures;
comparing the first image and the second image effective to determine a position or location of an object captured in the first image and the second image.

13. A method as described in claim 12, wherein the first light source illuminates the object from a different angle than the second light source.

14. A method as described in claim 13, wherein comparing the first image and the second image effective to determine a position or location of the object compares a first shadow of the object as illuminated by the first light source in the first image and a second shadow of the object as illuminated by the second light source in the second image.

15. A method as described in claim 14, wherein the object is moving and its location is tracked through the movement based on shadows of the object as illuminated by the first light source and the second light source.

16. A method as described in claim 12, wherein the synchronizing shuttering of the first shutter synchronizes the shuttering of the first shutter at a rate at least as fast as a rate of the rapid flashing of the first light source and the synchronizing shuttering of the second shutter synchronizes the shuttering of the second shutter at a rate at least as fast as a rate of the rapid flashing of the second light source.

17. A computing device comprising:
a first light source configured to flash at a first flash rate;
a second light source configured to flash at a second flash rate;
a first mechanical shutter configured to shutter at least as fast as the first flash rate;
a second mechanical shutter configured to shutter at least as fast as the second flash rate;
a controller configured to:
synchronize flashing of the first light source and shuttering of the first shutter effective to capture a first image integrating multiple exposures during which the first light source is flashed and synchronizing flashing of the second light source and shuttering of the second shutter effective to enable capture of a second image integrating multiple exposures during which the second light source is flashed; and
provide the first image and the second image, the first image and the second image are processed to determine a position or location of an object captured in the first image and the second image.

18. A computing device as described in claim 17, wherein the first light source illuminates the object from a different direction than the second light source.

19. A computing device as described in claim 18, wherein the first image and the second image are processed to determine a position or location of the object by comparing a first shadow of the object as illuminated by the first light source in the first image and a second shadow of the object as illuminated by the second light source in the second image.

20. A computing device as described in claim 19, wherein the object is moving and its location is tracked through the movement based on shadows of the object as illuminated by the first light source and the second light source.

* * * * *